(12) United States Patent
Lim et al.

(10) Patent No.: US 10,397,300 B2
(45) Date of Patent: Aug. 27, 2019

(54) METHOD AND OF IMPROVING HTTP PERFORMANCE ON COMMUNICATION NETWORK AND APPARATUS ADAPTED THERETO

(71) Applicants: Samsung Electronics Co., Ltd, Gyeonggi-do (KR); Kyung Hee University Industry Academic Cooperation Foundation, Gyeonggi-do (KR)

(72) Inventors: Hanna Lim, Gyeonggi-do (KR); Sungwon Lee, Gyeonggi-do (KR); Jicheol Lee, Gyeonggi-do (KR); Gijeong Kim, Gyeonggi-do (KR)

(73) Assignees: Samsung Electronics Co., Ltd., Suwon-si (KR); Kyung Hee University Industry Academic Cooperation Foundation, Yongin-si (KR)

( * ) Notice: Subject to any disclaimer, the term of this patent is extended or adjusted under 35 U.S.C. 154(b) by 669 days.

(21) Appl. No.: 14/721,915

(22) Filed: May 26, 2015

(65) Prior Publication Data
US 2015/0341467 A1  Nov. 26, 2015

(30) Foreign Application Priority Data
May 26, 2014  (KR) ......................... 10-2014-0062888

(51) Int. Cl.
*H04L 29/06* (2006.01)
*H04L 29/08* (2006.01)
(Continued)

(52) U.S. Cl.
CPC ............ *H04L 67/02* (2013.01); *G06F 16/957* (2019.01); *H04L 29/12103* (2013.01);
(Continued)

(58) Field of Classification Search
CPC ............ G06F 16/957; H04L 29/12103; H04L 61/1535
See application file for complete search history.

(56) References Cited

U.S. PATENT DOCUMENTS 7,328,280 B2 * 2/2008 Takeda .............. H04L 29/12066
709/220
7,899,932 B2 * 3/2011 Takeda .............. H04L 29/12066
709/230

(Continued)

FOREIGN PATENT DOCUMENTS

KR   20130022493 A   3/2013
KR   20130100752 A   9/2013

OTHER PUBLICATIONS

A. A Johnston, S. Donovan, R. Sparks, C. Cunningham, and K. Summers. "Session Initiation Protocol (SIP) Basic Call Flow Examples". RFC 3665. Dec. 2003. 94 pages.*

(Continued)

*Primary Examiner* — Ranodhi Serrao

(57) ABSTRACT

A method of improving Hyper Text Transfer Protocol (HTTP) performance on communication networks and an apparatus adapted to the method are provided. In a communication system including a first server, a second server and at least one connection server for connecting the first and second servers, the communication method using the first server includes: receiving a request for content from at least one client; establishing a bypass connection to directly receive data from the second server; directly receiving data about the content from the second server by using the bypass connection; and transmitting the data to the client.

14 Claims, 42 Drawing Sheets

(51) Int. Cl.
*H04L 29/12* (2006.01)
*G06F 16/957* (2019.01)

(52) U.S. Cl.
CPC ........ *H04L 61/1535* (2013.01); *H04L 67/288* (2013.01); *H04L 67/2842* (2013.01); *H04L 69/16* (2013.01); *H04L 67/2852* (2013.01)

(56) References Cited

U.S. PATENT DOCUMENTS

| | | | | |
|---|---|---|---|---|
| 8,085,741 B2* | 12/2011 | Kiss | ................ | H04L 29/125 370/338 |
| 8,085,746 B2* | 12/2011 | Kiss | ................ | H04L 29/125 370/338 |
| 8,416,753 B2* | 4/2013 | Kiss | ................ | H04L 29/125 370/338 |
| 8,964,524 B2* | 2/2015 | Prouvost | ................ | 370/216 |
| 9,178,917 B2* | 11/2015 | Mosko | ................ | H04L 65/1069 |
| 9,363,133 B2* | 6/2016 | Yoakum | ................ | H04L 29/08054 |
| 2004/0139227 A1* | 7/2004 | Takeda | ................ | H04L 29/12066 709/245 |
| 2004/0139228 A1* | 7/2004 | Takeda | ................ | H04L 29/12066 709/245 |
| 2005/0201320 A1* | 9/2005 | Kiss | ................ | H04L 29/125 370/328 |
| 2010/0115107 A1* | 5/2010 | Mitsuhashi | ................ | H04L 65/1006 709/227 |
| 2010/0211660 A1* | 8/2010 | Kiss | ................ | H04L 29/125 709/221 |
| 2010/0238928 A1* | 9/2010 | Prouvost | ................ | H04L 29/06027 370/392 |
| 2012/0096176 A1* | 4/2012 | Kiss | ................ | H04L 29/125 709/228 |
| 2012/0158862 A1* | 6/2012 | Mosko | ................ | H04L 65/1096 709/206 |
| 2012/0243549 A1* | 9/2012 | Lyons | ................ | H04L 65/1069 370/410 |
| 2013/0188560 A1* | 7/2013 | Kiss | ................ | H04L 29/125 370/328 |
| 2013/0232231 A1 | 9/2013 | Laurent et al. | | |
| 2014/0095724 A1* | 4/2014 | Yoakum | ................ | H04L 29/08054 709/228 |
| 2014/0259108 A1* | 9/2014 | Clark | ................ | H04L 63/08 726/3 |
| 2014/0337405 A1* | 11/2014 | Athas | ................ | H04L 67/26 709/203 |

OTHER PUBLICATIONS

M. Handley, V. Jacobson, and C. Perkins. "SDP: Session Description Protocol". RFC 4566. Jul. 2006. 49 pages.*

* cited by examiner

FIG. 8
(Prior art)

```
<html>
    <head>
        <title> example 1 </title>
    </head>

<body>
        <script type=" text/javascript " src=" ./a.js " ></script>
        <script type=" text/javascript " src=" ./b.js " ></script>
    </body>
<html>
```
example1.html

```
alert(" Hello. ");
```
a.js

```
alert(" Good Bye. ");
```
b.js

FIG. 13

Current Resource URL & ID TABLE

| Resource URL | Resource ID |
|---|---|
| "http://server1.com/iframe1.html" | 5361e75bbf8662d2b06255617734b052083fe4c56 |
| "http://server2.com/image2.jpg" | 0183a8eb3d28a61335d1b32362fefa6eacfb6c89 |

Previous Resource URL & ID TABLE

| Resource URL | Resource ID |
|---|---|
| "http://server1.com/iframe1.html" | 5361e75bbf8662d2b06255617734b052083fe4c56 |
| "http://server2.com/image2.jpg" | 0183a8eb3d28a61335d1b32362fefa6eacfb6c89 |

FIG. 14

Proxy-to-Proxy Forwarding Info TABLE

| Content Prefix | IP Address | Port Number |
|---|---|---|
| Khu.ac.kr/ | 6.6.6.6 | 1600 |
| Khu.ac.kr/js | 6.6.6.6 | 1600 |
| Khu.ac.kr/dart | 6.6.6.6 | 1600 |

FIG. 15

Supported Language Info TABLE

| Browser | Supported language | | |
|---|---|---|---|
| | JavaScript | Python | Dart |
| Firefox | O | O | X |
| Explorer | O | X | X |
| Chrome | O | O | O |
| Safari | O | X | O |

FIG. 16

Supported JavaScript Library Info TABLE

| Version | Supported Frameworks & Extensions | | | |
|---|---|---|---|---|
| | jQuery | YUI | SVG | Dojo |
| Chrome 28 | O | X | X | X |
| Chrome 29 | O | X | O | O |
| Chrome 30 | O | O | O | O |

| Version | Supported Frameworks & Extensions | | | |
|---|---|---|---|---|
| | jQuery | YUI | SVG | Dojo |
| Safari 4 | O | X | X | X |
| Safari 5 | O | X | O | X |
| Safari 6 | O | O | O | O |

| Version | Supported Frameworks & Extensions | | | |
|---|---|---|---|---|
| | jQuery | YUI | SVG | Dojo |
| Firefox 23 | O | X | X | X |
| Firefox 24 | O | O | X | O |
| Firefox 25 | O | O | O | O |

| Version | Supported Frameworks & Extensions | | | |
|---|---|---|---|---|
| | jQuery | YUI | SVG | Dojo |
| Explorer 8 | O | X | X | X |
| Explorer 9 | O | O | X | X |
| Explorer 10 | O | O | O | O |

FIG. 17

Function & ID TABLE

| Function Name | Function ID |
|---|---|
| A_10 | 1b3313872c55fcd556b47e062c8c6ecd7365a467 |
| A_20 | a0171dcb74d7f231adf1aec8602a12d73b0c5d58 |
| A_30 | 222090b1e4c79243e3b8631babd7b49d3fd15bf2 |
| Remain | 37f10ed4c52b172e73833602487b1953c07356fb |

FIG. 18

Script & ID TABLE

| Script Version | Script ID |
|---|---|
| #1 | cb917dc448583943e435a5c57a35198280506040 |

FIG. 19

Manipulation Info TABLE

| Function name | Manipulation |
|---|---|
| A_10 | New |
| A_20 | New |
| A_30 | New |
| Remain | New |

METHOD AND OF IMPROVING HTTP PERFORMANCE ON COMMUNICATION NETWORK AND APPARATUS ADAPTED THERETO

CROSS-REFERENCE TO RELATED APPLICATION(S) AND CLAIM OF PRIORITY

The present application is related to and claims benefit under 35 U.S.C. § 119(a) of a Korean patent application filed on May 26, 2014 in the Korean Intellectual Property Office and assigned Serial No. 10-2014-0062888, the entire disclosure of which is hereby incorporated by reference.

TECHNICAL FIELD

The present disclosure relates to communication performance on communication networks, and more particularly, to a method of improving Hyper Text Transfer Protocol (HTTP) performance on communication networks and an apparatus adapted to the method.

BACKGROUND

With the development of network technology, technologies using web content through electronic devices have also developed. Environments to use web content are related to a cache consistency scheme, a proxy server, an optimized-content providing technology, a technique for minimizing the size of JAVASCRIPT files, etc. These technologies are disadvantageous as follows.

First, Cache Consistency Scheme has a trade-off problem between Strong Cache Consistency and network load or server load: when Strong Cache Consistency is provided, network load or server load increases; in contrast, when network load or server load is reduced, Strong Cache Consistency is not proved.

Secondly, Proxy Chain: A client's HTTP request message is transmitted to a server according to Proxy chain. The server's HTTP response message is transmitted to the client through the path that the client's HTTP request message has been transmitted. When proxy change is configured with a plurality of proxy servers, transmission delay occurs each time that an HTTP message passes by a proxy server. When a specific one of the proxy servers configuring proxy chain is proved with a web cache, load is converged to the proxy server.

Third, there is a technology in which a proxy server or web server provides optimized content by using client information, such as User-Agent of an HTTP message. This technology may transmit different web pages to different types of mobile devices or may transmit, to mobile devices, web pages in which the images are reduced or enlarged to meet the screen size of the mobile devices respectively. The technology just optimizes web content to be properly executed on mobile devices; however it does not optimize JAVASCRIPT code considering communication states and network states.

Fourth, JAVASCRIPT is a resource configuring web pages and serves as program codes. Therefore, JAVASCRIPT requires maintenance processes. Conventional technologies have reduced JAVASCRIPT code by removing space characters or unnecessary code; however they do not provide a function for reducing the size of JAVASCRIPT considering the reusable JAVASCRIPT code.

Therefore, technology is required to resolve the problems and improve a web content using environment.

SUMMARY

To address the above-discussed deficiencies, it is a primary object to provide a method of improving communication performance on communication networks and an apparatus adapted to the method. The present disclosure further provides a method of improving Hyper Text Transfer Protocol (HTTP) performance on communication networks and an apparatus adapted to the method.

In accordance with various embodiments of the present disclosure, the present disclosure provides a communication method using a first server in a communication system where the first server, a second server and at least one connection server for connecting the first and second servers are included, the method including: receiving a request for requesting content from at least one client; establishing a bypass connection to directly receive data from the second server; directly receiving data about the content from the second server by using the bypass connection; and transmitting the data to the client.

In accordance with various embodiments of the present disclosure, the present disclosure provides a first server of a communication system where the first server, a second server and at least one connection server for connecting the first and second servers are included, the first server including: a communication unit for communicating with at least one network node; and a controller for: receiving a request for requesting content from at least one client; establishing a bypass connection to directly receive data from the second server; directly receiving data about the content from the second server by using the bypass connection; and transmitting the data to the client.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example of a code that may cause a problem when one of the JAVASCRIPT objects received in parallel, which is received earlier than the others, is executed according to various embodiments of the present disclosure;

FIG. 13 illustrates resource ID tables according to various embodiments of the present disclosure;

FIG. 14 illustrates a proxy bypass connection mapping table according to various embodiments of the present disclosure;

FIG. 15 illustrates script languages supported by web browsers according to various embodiments of the present disclosure;

FIG. 16 illustrates supported JAVASCRIPT according to versions of a browser according to various embodiments of the present disclosure;

FIG. 17 illustrates a mapping table between the function name and function ID of JAVASCRIPT, according to various embodiments of the present disclosure;

FIG. 18 illustrates a table storing the JAVASCRIPT version and JAVASCRIPT ID according to various embodiments of the present disclosure;

FIG. 19 illustrates a mapping table between the function name and manipulation of JAVASCRIPT code according to various embodiments of the present disclosure;

DETAILED DESCRIPTION

FIGS. 1 through 40, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, exemplary embodiments of the present disclosure are described in detail with reference to the accompanying drawings. The same reference numbers are used throughout the drawings to refer to the same or similar parts. Detailed descriptions of well-known functions and structures incorporated herein may be omitted to avoid obscuring the subject matter of the disclosure.

In the following description, embodiments of the present disclosure will be explained based on a mobile communication network as an example of a communication network, but not limited thereto. It should be understood that the present disclosure may also be applied to wired communication networks.

The present disclosure is described, through four embodiments according to technologies for enhancing web service performance on wired communication network, wireless communication network and mobile communication network.

A first embodiment is a technology that reduces messages generated to verify cache consistency of resources configuring web pages and provides strong cache consistency.

A second embodiment is a technology that additionally creates transmission control protocol (TCP) connection between proxy servers not adjacent to each other, on proxy chains established to provide web services, and performs request and reception of content through the connection, thereby bypassing the proxy chains.

A third embodiment is a technology that allows a proxy server to optimize a JAVASCRIPT code, using radio link type, information about hardware and software, and preferred JAVASCRIPT code type of a mobile device, and to transmit the optimized JAVASCRIPT code to the mobile device.

A fourth embodiment is a technology that allows a web server to reduce the size of JAVASCRIPT code requested by a client, considering the reusable JAVASCRIPT code, and to transmit the reduced JAVASCRIPT code to the client.

In the following description, for the sake of convenience, although the four embodiments will be separately explained, it should be understood that they may also be modified by combining with each other.

The first embodiment is explained in detail referring to FIGS. 1 to 4. In order to provide a web cache, cache consistency scheme is implemented with polling-every-time, time-to-live, invalidation, and lease mechanism.

Figure 1:
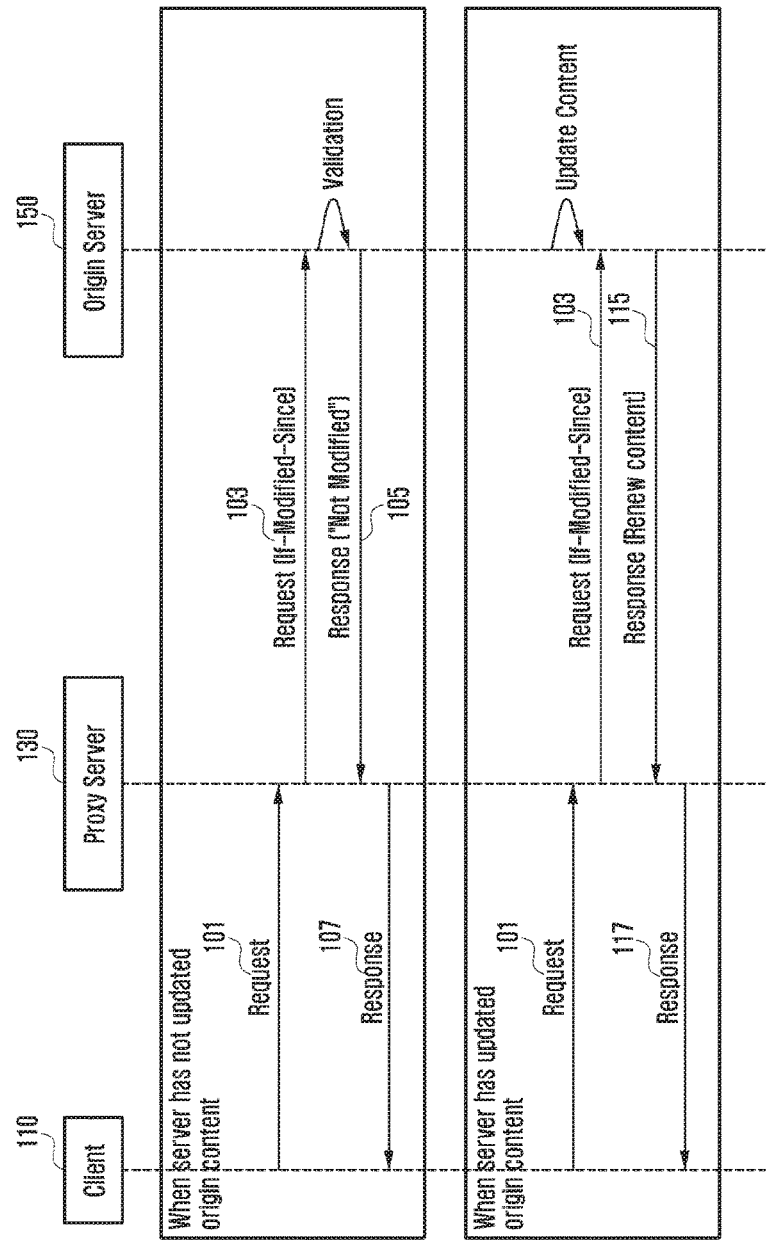
FIG. 1 illustrates a method of providing cache consistency based on a polling-every-time mechanism according to various embodiments of the present disclosure.

FIG. 1 is a diagram that describes a method of providing cache consistency based on a polling-every-time mechanism.

Polling-every-time is a mechanism for determining whether content has been updated on an origin server, each time that a proxy server or a mobile device requests the content. In HTTP, a mobile device or a proxy server inquires of an origin server whether corresponding content has been changed, using "If-Modified-Since" header and "If-Match" header of a request message. When origin content has not been changed, the origin server sends a response message, "Not Modified." When origin content has been changed, the origin server responds to the request with the changed content.

FIG. 1 is a sequence diagram of polling-every-time using a "Not Modified" message from among the HTTP response message and the "If-Modified-Since" header of the HTT request message. Referring to FIG. 1, the proxy server 130 receives an HTTP request message from a client 110 (101). The embodiment of the present disclosure is described, based on a mobile device as an example of the client. The proxy server 130 includes "If-Modified-Since" header in a corresponding message, with specifying the current time, and transmits the message to the origin server 150 (103). When origin content has not been updated (validation), the origin server 150 transmits an HTTP response message, "Not Modified," to the proxy server 130 (105). After receiving the response "Not Modified," the proxy server 130 transmits, to the client 110, copy content that it has received from the origin server 150 (107). When origin content has been updated, the origin server 150 transmits an HTTP response message with the updated content (renew content) to the proxy server 130 (115). The proxy server 130 transmits the received renew content to the client 110 (117).

Since the polling-every-time inquires of the origin server whether origin content has been updated each time a request is made for content, it provides strong cache consistency, maintaining strict consistency between origin content and the copy content. Although origin content has not been updated, the polling-every-time always causes a message to check the update, and this causes traffic on the network. Content with a relatively long period of update causes traffic to check whether the content has been updated on the network. For a network with a relatively large amount of delay such as a mobile network, a procedure checking whether content has been updated causes a page loading period of time to increase. Since the number of resources configuring a web page increasingly increases, the polling-every-time lowers the user satisfaction of web services.

Figure 2:
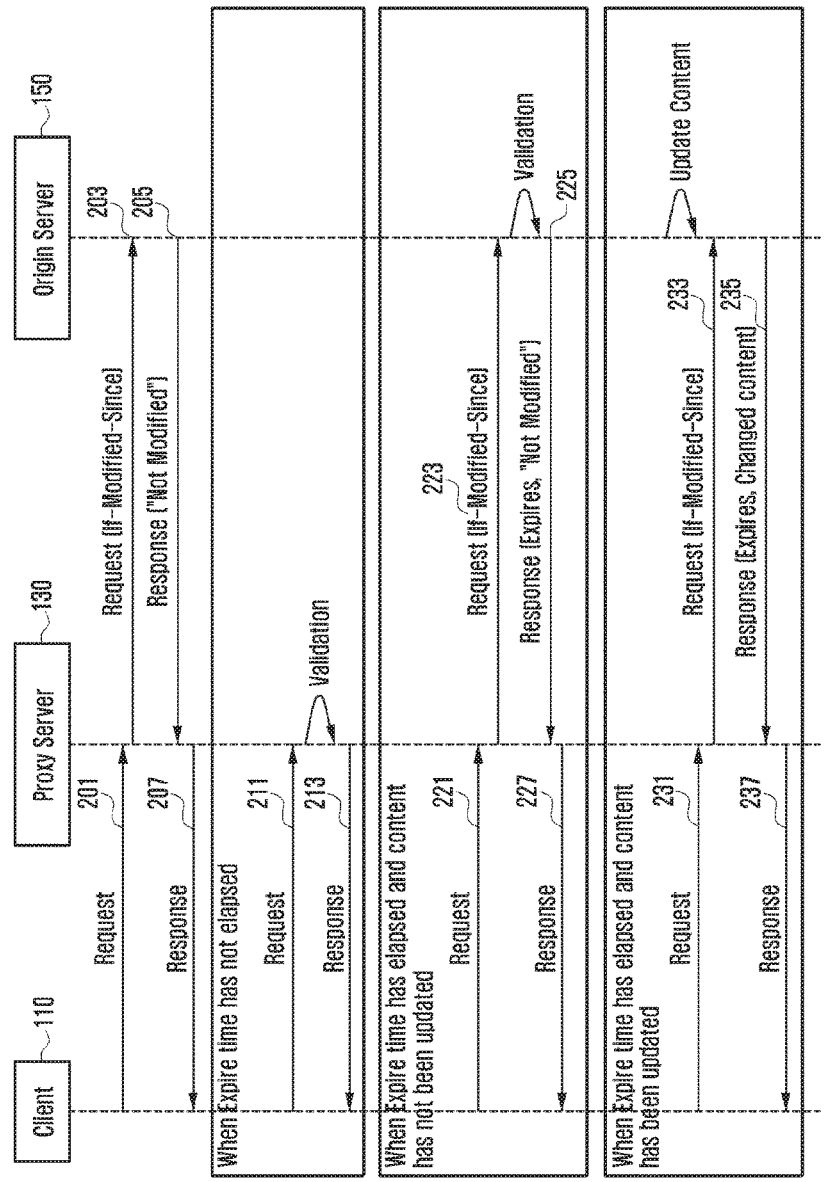
FIG. 2 illustrates a method of providing cache consistency based on a time-to-live mechanism according to various embodiments of the present disclosure.

FIG. 2 is a diagram that describes a method of providing cache consistency based on a time-to-live mechanism.

Time-to-live is a mechanism that allows an origin server to transmit, when receiving a request for content from a client or proxy server, the content through a web cache for a period of time. The time-to-live just allows for a web cache but does not guarantee the consistency of the cache. In HTTP, a client or proxy server inquires of an origin server whether content has been updated using the "If-Modified-Since" of a request message; and the server writes an allowable period of time in the response to be provided to a web cache using the "Expires" or "Cache-Control" header of the response message and responds thereto.

FIG. 2 is a sequence diagram of time-to-live using the "If-Modified-Since" header of HTT request message and the "Expires" header of HTTP response message. Referring to FIG. 2, in a state where a proxy server has copy content through the initial request and has received an expiration time of a web cache from an origin server through the "Expires" header, three cases for the time-to-live are shown. One case is where the cache has not expired; another case is where the cache has expired and origin content has not updated; and the other case is where the cache has expired and origin content has updated.

The proxy server 130 receives an HTTP request message from a client 110 (201). The proxy server 130 includes "If-Modified-Since" header in a corresponding message and transmits the message to the origin server 150 (203). The origin server 150 provides the proxy server 130 with content and expiration time of a web cache through the "Expires" header (205). The proxy server 130 transmits the copy content, transmitted from the origin server 150, to the client 110 (207).

For a case where the cache has not expired, the client 110 transmits a content request to the proxy server 130 (211). After receiving the request, the proxy server 130 transmits content that it has received from the origin server 150 to the client 110, without transmitting a request message inquiring of the origin server 150 as to whether origin content has been updated (213).

For a case where the cache has expired and origin content has not updated, the client 110 transmits an HTTP request message to the proxy server 130 (221). The proxy server 130 writes the "If-Modified-Since" header to check whether content has been updated and transmits it to the origin server 150 (223). Since origin content has not been updated (validation), the origin server 150 transmits the "Not Modified"

response message, expressing a new expiration of the cache in the "Expires" header, to the proxy (225). After receiving the response, the proxy server 130 transmits copy content that it has received to the client 110 (227).

For a case where the cache has expired and origin content has updated, the client 110 transmits an HTTP request message to the proxy server 130 (231). The proxy server 130 writes the "If-Modified-Since" header to check whether content has been updated and transmits it to the origin server 150 (233). Since origin content has been updated (updated content), the origin server 150 transmits the response of the updated/changed content, expressing a new expiration of the cache in the "Expires" header, to the proxy server 130 (235). After receiving the response, the proxy server 130 transmits the updated/changed content to the client 110 (237).

Since the time-to-live does not inquire whether origin content has been updated until the cache has expired, it reduces traffic on the network and a page loading period of time on a mobile network with a relatively large amount of delay, which are advantageous. When origin content was, however, updated before the cache has expired, the time-to-live provides weak cache consistency, not maintaining the consistency between origin content on the origin server and the copy content on the proxy server.

These cause problems on systems that are provided with content frequently updated and sensitive time. An expiration of the cache needs to be properly set, according to the extent of sensitivity to the consistency and the update period of time of content. When the expiration of the cache is set too long, the response time and traffic can be reduced but strong cache consistency cannot be provided. When the expiration of the cache is set to be too short, strong cache consistency can be provided but the response time and traffic increase.

Figure 3:
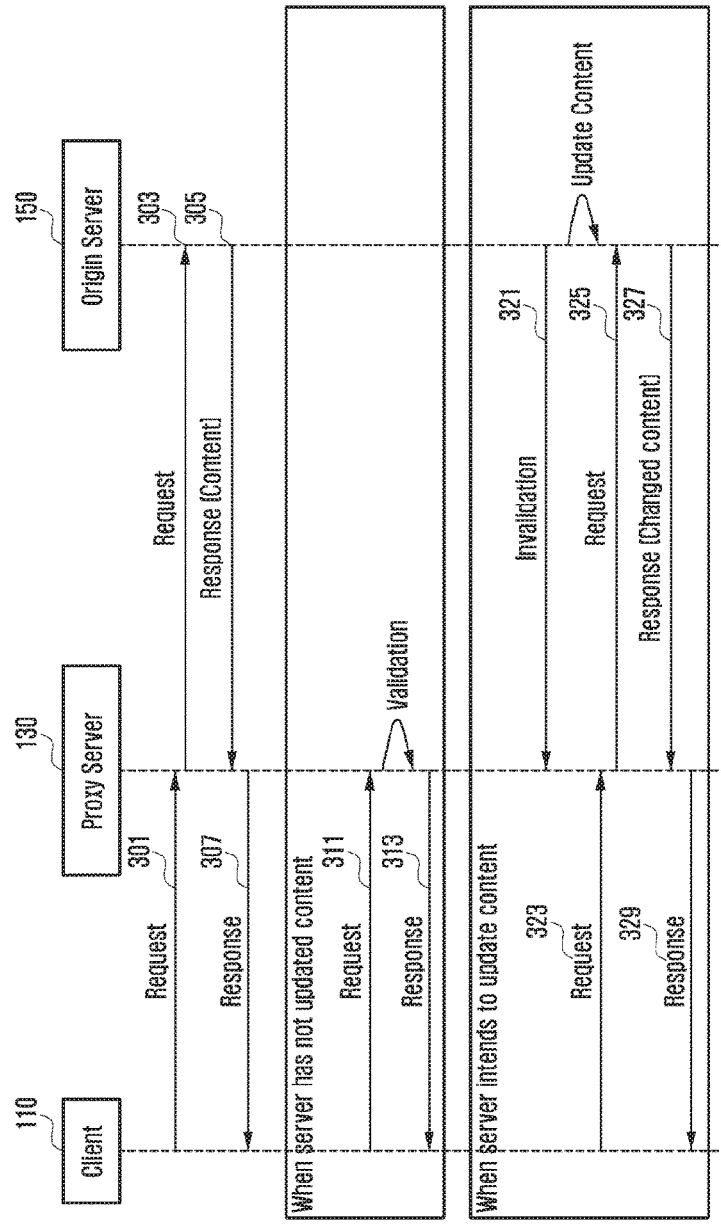
FIG. 3 illustrates a method of providing cache consistency based on an invalidation mechanism according to various embodiments of the present disclosure.

FIG. 3 is a diagram that describes a method of providing cache consistency based on an invalidation mechanism.

Invalidation is a mechanism that provides content distributed by an origin server to a web cache without time limit and notifies a proxy server or a client that content will be updated before the content is changed. In HTTP, since a request for content and the response are made using a content request message and a response message and an invalidation message is not defined as a standard header, transmission to a client or proxy server is performed by using an arbitrary header or via a message specifically defined.

FIG. 3 is a sequence diagram of a method of providing a cache consistency by an invalidation mechanism. Client 110 is provided with content and proxy server 130 has copy content through operations 301 to 307. In a state where the proxy server 130 has had copy content according to the initial request of the client 110, the invalidation scheme performs different processes according to cases that the origin server 150 has not changed content and intends to change content.

For a case that the origin server 150 has not changed content (validation), the client 110 requests content from the proxy server 130 (311). After receiving the request, the proxy server 130 transmits copy content to the client 110, without inquiring of the origin server 150 whether content has been updated (313).

For a case that the origin server 150 intends to change content (update content), the origin server 150 transmits an invalidation message notifying that content will be updated to the proxy server 130 or the client 110 that has requested the content (321). When the origin server 150 ascertains that the proxy server 130 or client 110 has received the invalidation message, it updates the content.

From the fact that the client 110 requests the update content from the proxy server 130 (323) and the proxy server 130 has received the invalidation message, the origin content has been updated in the origin server 150. The proxy server 130 transmits a request message for the update content to the origin server 150, without transmitting copy content to the client 110, (325). The proxy server 130 receives the update content from the origin server 150 in response to the request (327). The proxy server 130 transmits the received update content to the client 110 (329).

As described above, the invalidation scheme provides strong cache consistency maintaining strict consistency of content between the origin server and the proxy server and reduces traffic that is created to check whether content has been updated. The invalidation scheme is disadvantageous in that load is created on the origin server so that it has to record, track and manage proxy servers and clients that have distributed content. When failure occurs on a network and this causes a problem so that a proxy or client cannot receive an invalidation message, updating content on the origin server is delayed indefinitely, which is also disadvantageous. Although the invalidation scheme has advantages that it provides strong cache consistency and reduces network traffic, since the disadvantages that it overloads server and delays updating content without time limit are so serious that the advantages cannot be accepted, it is not used in real web services.

Figure 4:
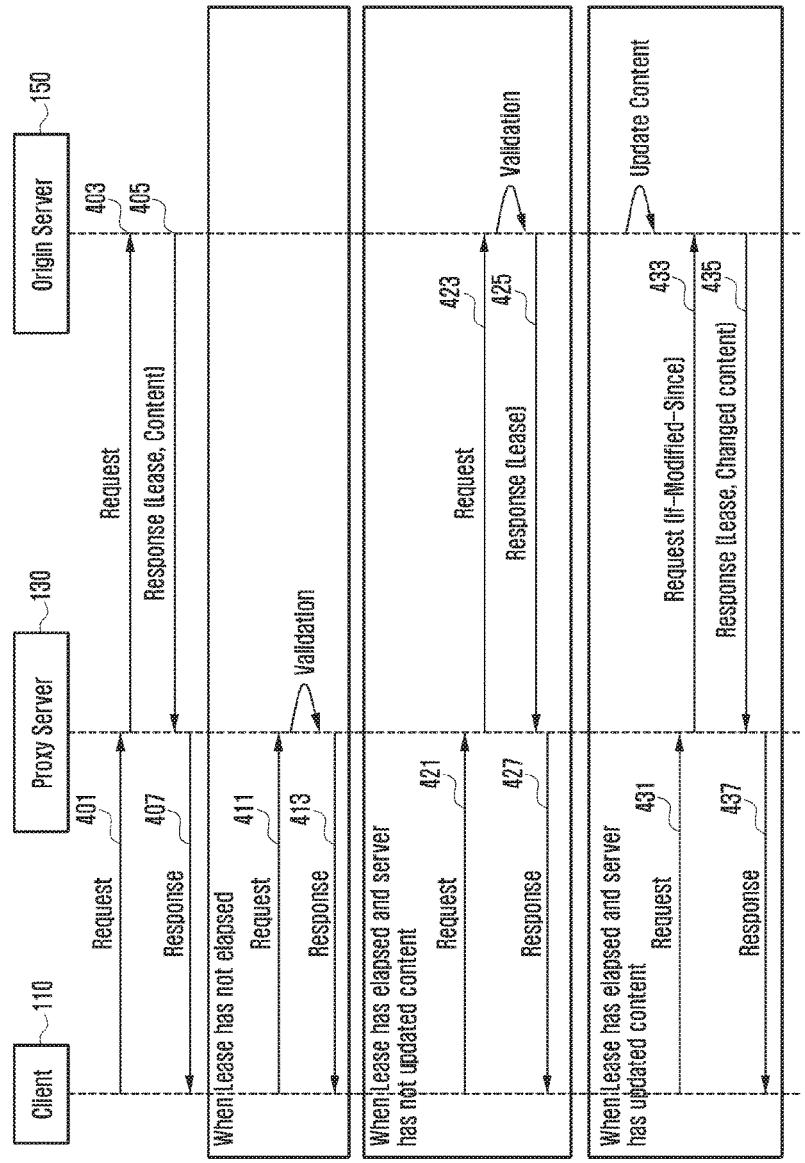
FIG. 4 illustrates a method of providing cache consistency based on a Lease mechanism according to various embodiments of the present disclosure.

FIG. 4 is a diagram that describes a method of providing cache consistency based on a Lease mechanism.

Lease is a mechanism of a combination of time-to-live and invalidation mechanisms. Like the time-to-live scheme, the lease mechanism issues a lease that is a period of time allowed for a web cache, without a procedure to check whether content has been updated. Unlike the time-to-live, the lease mechanism guarantees a cache consistency as an origin server does not update content during the lease. When an origin serve intends to update content, it updates the content after lease has expired. In HTTP, since the lease header is not defined, a header additionally written is provided.

FIG. 4 is a sequence diagram of a method of providing a cache consistency by a lease mechanism. In a state where the proxy server has had copy content according to the initial request of the client 110, the lease mechanism performs different process according to the following cases that: a lease has not elapsed; a lease has elapsed and the origin server has not updated origin content; and a lease has elapsed and the origin server intends to update origin content.

Referring to FIG. 4, operations 401 to 407 correspond to operations 201 to 207 shown in FIG. 2. The proxy server 130 receives information related to the lease from the origin server 150, instead of the expires information shown in FIG. 2.

For a case where lease has not elapsed, the client 110 requests content from the proxy server 130 (411). Since the lease issued from the origin server 150 has not elapsed, the proxy server 130 transmits copy content that it has stored to the client 110, without inquiring of the origin server 150 whether content has been updated (413).

For a case that a lease has elapsed and the origin server has not updated origin content, the proxy server 130 receives a content request from the client 110 (421). Since lease has elapsed, the proxy server 130 transmits a request message to receive a new cache expiration to the origin server 150 (423). After receiving the request message, the origin server 150 reissues, to the proxy server 130, only a lease for allowing for the provision of corresponding content to a cache since the origin server 150 has not updated origin content (validation) (425). After receiving the lease, the proxy server 130 transmits copy content that it has stored to the client 110 (427).

For a case that a lease has elapsed and the origin server intends to update origin content (update content), the origin server 150 ascertains that its issued lease for a cache has elapsed and updates content (update content). The client 110 transmits a request message to the proxy server 130 (431). Since the lease issued from the origin server 150 has elapsed, the proxy server 130 receives the request message from the client 110 and transmits a request message to receive new cache expiration to the origin server 150 (433). Since contend has been updated, the origin server 150 receives the request message from the proxy server 130 and transmits the update content and a new lease to the proxy server 130 (435). The proxy server 130 transmits the update content to the client 110 and provides a web cache during the lease without checking whether corresponding content has been updated (437).

Like the time-to-live, the lease mechanism does not check whether content has been updated until a cache has expired, thereby reducing traffic and the response time. Like the invalidation, the lease mechanism provides strong cache consistency. The lease mechanism does not need to track and manage all clients and proxy servers that have issued content. The lease mechanism creates a lower amount of load than the invalidation mechanism. The lease mechanism resolves the problem that, when a client does not receive an invalidation message due to a network failure, updating content on the origin server is delayed indefinitely. The lease mechanism is disadvantageous in that: the more a lease period of time is set to be, the more a waiting period of time to update content; and the less a lease period of time is set to be, the more often a process for checking whether content has been updated needs to be performed, which is increasing traffic.

In the following description, the second embodiment is explained in detail referring to FIG. 5.

Web content systems employ web caches to reduce load on the network and the response time to web services. Web caches are located in various locations such as servers, proxy servers, clients, etc.; however, proxy servers are in general used as intermediaries serving as web caches. This is because proxy servers are located in any geographical locations, such as Internet Service Provider (ISP), Network Service Provider (NSP), etc., reduce and distribute traffic generated on networks, and provide various access paths for web caches. Proxy servers connect to each other hierarchically, forming a proxy chain according to a connection configuration. An HTTP request message is forwarded through a proxy chain from a client to a server, and the HTTP response message is forwarded back through the proxy chain, through which the HTTP request message was forwarded, from the server to the client.

Figure 5:
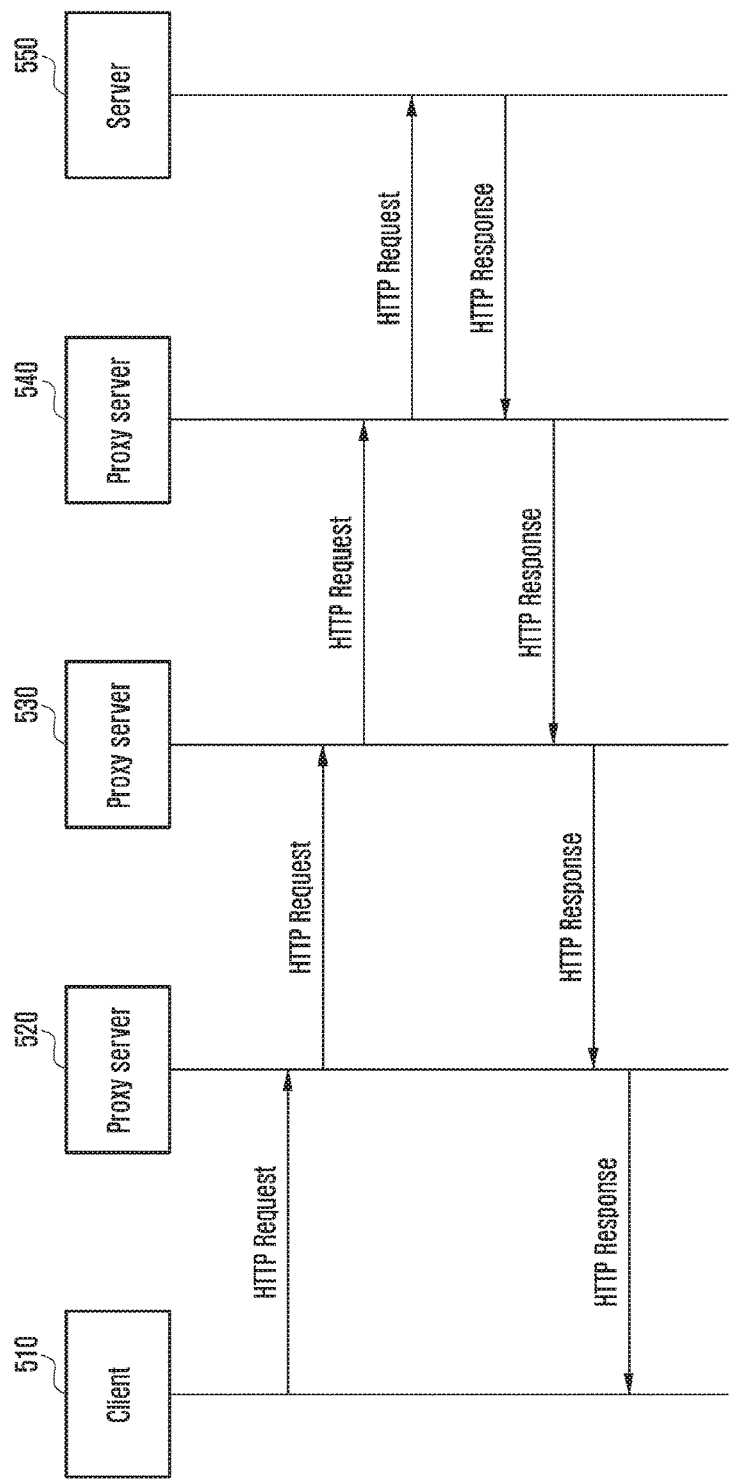
FIG. 5 illustrates communication through a plurality of proxy chains according to various embodiments of the present disclosure.

FIG. 5 is a flow chart that describes communication through a plurality of proxy chains. Referring to FIG. 5, the communication system includes a client 510, proxy servers 520, 530 and 540, and a server 550.

In the embodiment of FIG. 5, in a state where a proxy change is established by the three proxy servers 520, 530 and 540 between the client 510 and the server 550, the client 510 requests and receives web pages from the server 550. When the client 510 requests content from the server 550 by using an HTTP request message, the HTTP request message is forwarded through the proxy servers 520, 530, and 540 in order to the server 550. After receiving the HTTP request message, the server 550 transmits the HTTP response message including the content to the client 510. The HTTP response message is forwarded back through the proxy servers 540, 530 and 520 in order to the client 510.

Figure 6:
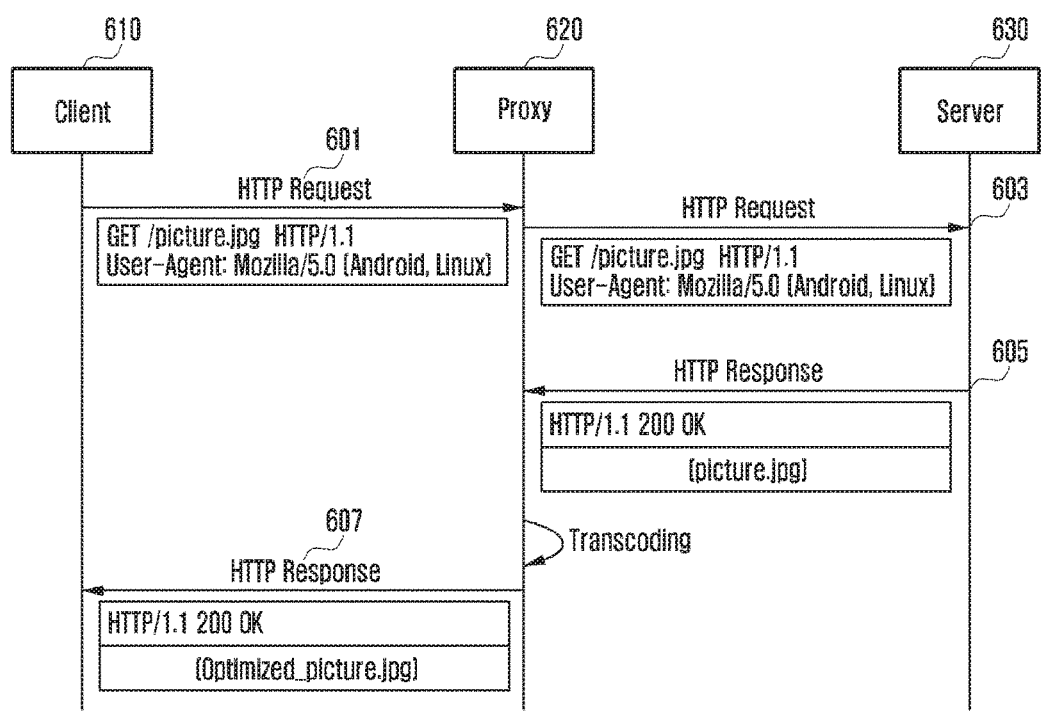
FIG. 6 illustrates a method of providing optimized content by using an HTTP request message according to various embodiments of the present disclosure.

In the following description, the third embodiment is explained in detail referring to FIG. 6. FIG. 6 is a flow chart that describes a method of providing optimized content by using an HTTP request message.

The optimization for the embodiment is a technology that allows a server to optimize content based on the information about a client, such as the screen size, operating system, browser, etc. and to transmit the optimized content to the client. In order to request content from the server, the client writes information about the operating system and browser in the User-Agent header of the HTTP request message, and the information about the screen size in the UA-Disp header and transmits the information to the server. After receiving the information, the server creates optimized content, using the operating system, browser, and screen size of the client, for example, by reducing images, and provides it to the client.

FIG. 6 shows a sequence diagram of a method of providing optimized content where: when the client 610 writes a User-Agent header of an HTTP request message and requests content from the server 630 through the message, the server 630 transmits content to the proxy server 620 through the HTTP response message, and the proxy server 620 forwards optimized content to the client 610.

When the client 610 is a mobile device, it writes information about the web browser and operating system in the User-Agent header of the HTTP request message and requests content from the server 630 through the message (601). The User-Agent header indicates that the web browser is MOZILLA/5.0 and the operating system is ANDROID platform of LINUX operating system. The content requested by the client 610 is picture.jpg. The HTTP request message is forwarded to the server 630 through the proxy server 620 (603). The server 630 transmits the HTTP response message containing picture.jpg file to the proxy server 620 (605). The proxy server 620 detects that the client 610 is a mobile device through the User-Agent header of the HTTP request message that it has received. The proxy server 620 reduces the received file, picture.jpg, in size, includes the size-reduced file, picture.jpg, in the HTTP response message, instead of the existing picture.jpg, and transmits it to the client 610 (607). Since the technology of the embodiment optimizes content using only the information about the client, it is disadvantageous in that it cannot optimize a variety of content and enhance a web performance using information related to communication and network.

In the following description, the fourth embodiment is explained in detail.

JAVASCRIPT allows for interactive communication between client and server and provides users with dynamic web pages and Graphic User Interface (GUI). JAVASCRIPT is one of the most important elements to provide web services. In November 2013, the average size of web page was 1653 KB, and of them, 267 KB is JAVASCRIPT. Increasingly, JAVASCRIPT code increases in size and the importance of JAVASCRIPT also increases. However, JAVASCRIPT is one of the causes that increase a page loading time. When a web browser receives a web page containing a plurality of resources, while downloading and running JAVASCRIPT, a request is made to interrupt resources located after a corresponding JAVASCRIPT, which is called the blocking of JAVASCRIPT.

Figure 7:
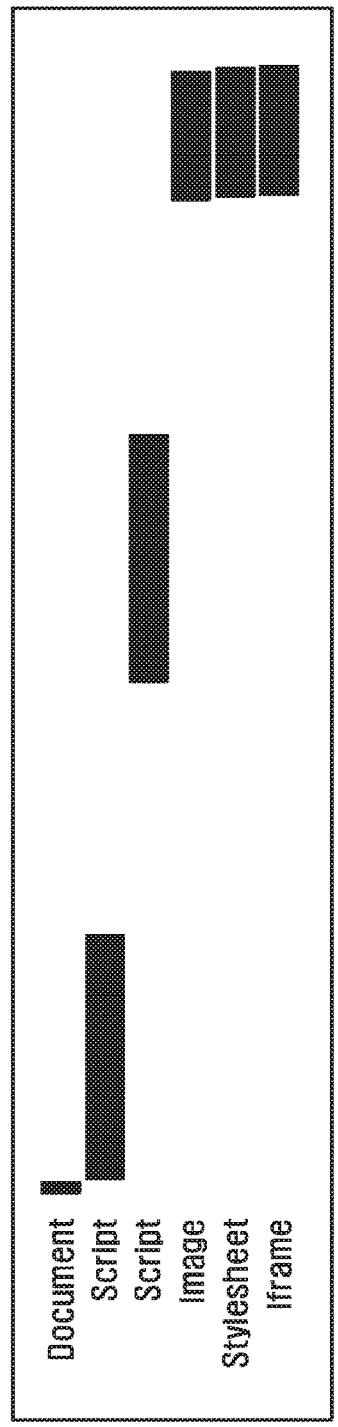
FIG. 7 illustrates reception of a web page and resources including JAVASCRIPT according to various embodiments of the present disclosure.

FIG. 7 is a diagram of a time line showing the order of download when a request is made for a web page containing two JAVASCRIPT objects, one image, one Stylesheet, and one IFRAME. When a request is made for a web page and the web page has been received, the resources of the web page are requested in order. The resources are arranged in order: JAVASCRIPT, image, Stylesheet, and IFRAME. Since the first JAVASCRIPT is requested, until it has been received and run, any resource is not requested. When the first JAVASCRIPT has run, the next resource, i.e., second JAVASCRIPT, is requested. Until the second JAVASCRIPT has been received and run, any other resource is not requested. When the second JAVASCRIPT has run, the following resources are requested. Since the following requested located after JAVASCRIPT are not JAVASCRIPT, they are requested and received in parallel. The reason why web browsers are implemented to block JAVASCRIPT is to provide an independent environment to JAVASCRIPT, so that JAVASCRIPT runs stably.

FIG. 8 is an example of a code that may cause a problem when one of the JAVASCRIPT objects received in parallel, which is received earlier than the others, is executed. The file, example1.html, includes a.js and b.js. A browser that has received example.html requests and receives the a.js. When the browser has run the a.js, it has to request, receive, and run the b.js. When the browser simultaneously requests the a.js and b.js, it first receives the b.js according to the network status or the size of JAVASCRIPT. When the b.js is first received, it runs earlier than the a.js, and "Good Bye." is displayed before "Hello." Therefore, the code causes a problem that the integrity of web pages is not maintained.

As described above, JAVASCRIPT is advantageous in that it provides dynamic web pages and interactive services between the server and client. On the contrary, JAVASCRIPT is disadvantageous because it causes the blocking phenomenon and thus increases a page loading time.

When the size of JAVASCRIPT to be transmitted is reduced, the transmission time is decreased. This reduces a period of time when the blocking of JAVASCRIPT occurs, thereby reducing the page loading time. An example of a technology for reducing the size of JAVASCRIPT is closure compiler of GOOGLE.

The closure compiler changes the existing JAVASCRIPT source code to a JAVASCRIPT source code small in size. The closure compiler reduces the size of JAVASCRIPT source code by reducing the length of variable, removing space characters, unnecessary codes, etc. The changed JAVASCRIPT source code works the same way as the existing JAVASCRIPT source code.

For example, the following JAVASCRIPT codes are the results before and after applying closure compiler to JAVASCRIPT that has not been complied by closure compiler.

[Before applying closure compiler to JAVASCRIPT]

```
function hello(name) {
    // greets the user
    Alert('Hello,' + name);
}
Hello('Newuser');
```

[After applying closure compiler to JAVASCRIPT]

```
function hello(name){alert("Hello," + name)}hello("New user");
```

As descried above, when the closure compiler is applied to the JAVASCRIPT code (Before) that has not been complied by closure compiler by removing space characters, newline characters, annotation characters, etc., the JAVASCRIPT code (After) reduced in size is created.

Figure 9:
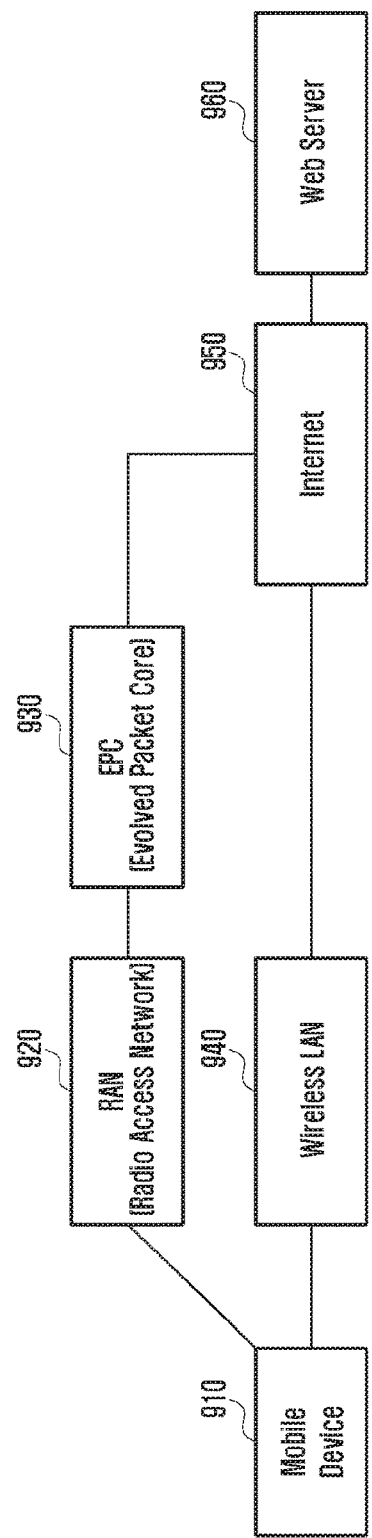
FIG. 9 illustrates a communication system according to various embodiments of the present disclosure.

FIG. 9 is a schematic block diagram of a communication system according to various embodiments of the present disclosure. The embodiment of FIG. 9 is explained based on a mobile communication system as a communication system, but not limited thereto. It should be understood that the disclosure can also be applied to wired communication systems.

Referring to FIG. 9, the mobile communication system includes Radio Access (RAN) 920 connecting a mobile device 910 as an example of a client and eNB communicating with the mobile device 910 in wireless mode, an Evolved Packet Core (EPC) 930, a Wireless LAN 940, Internet 950 and a web server 960.

Figure 10:
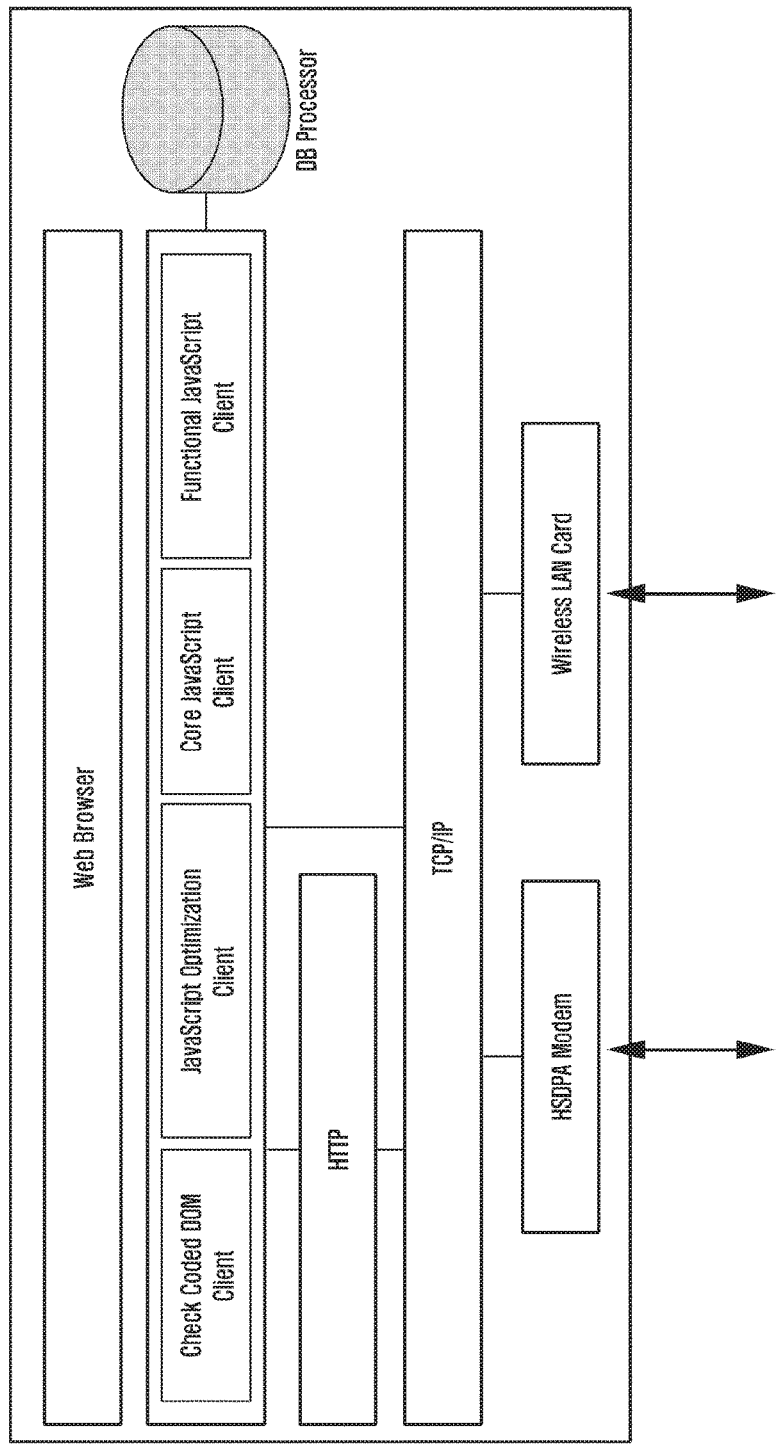
FIG. 10 illustrates a mobile device according to various embodiments of the present disclosure.

FIG. 10 is a diagram that describes a mobile device according to various embodiments of the present disclosure. The mobile device is a wireless mobile device using only a wireless communication link or a mobile device using wire and wireless communication links. It should be understood that the mobile device of the present disclosure is not limited to the embodiment of FIG. 10. For example, the mobile device further includes a controller for controlling the entire operation of the mobile device and a communication unit for communicating with external network nodes of the mobile device.

Figure 11:
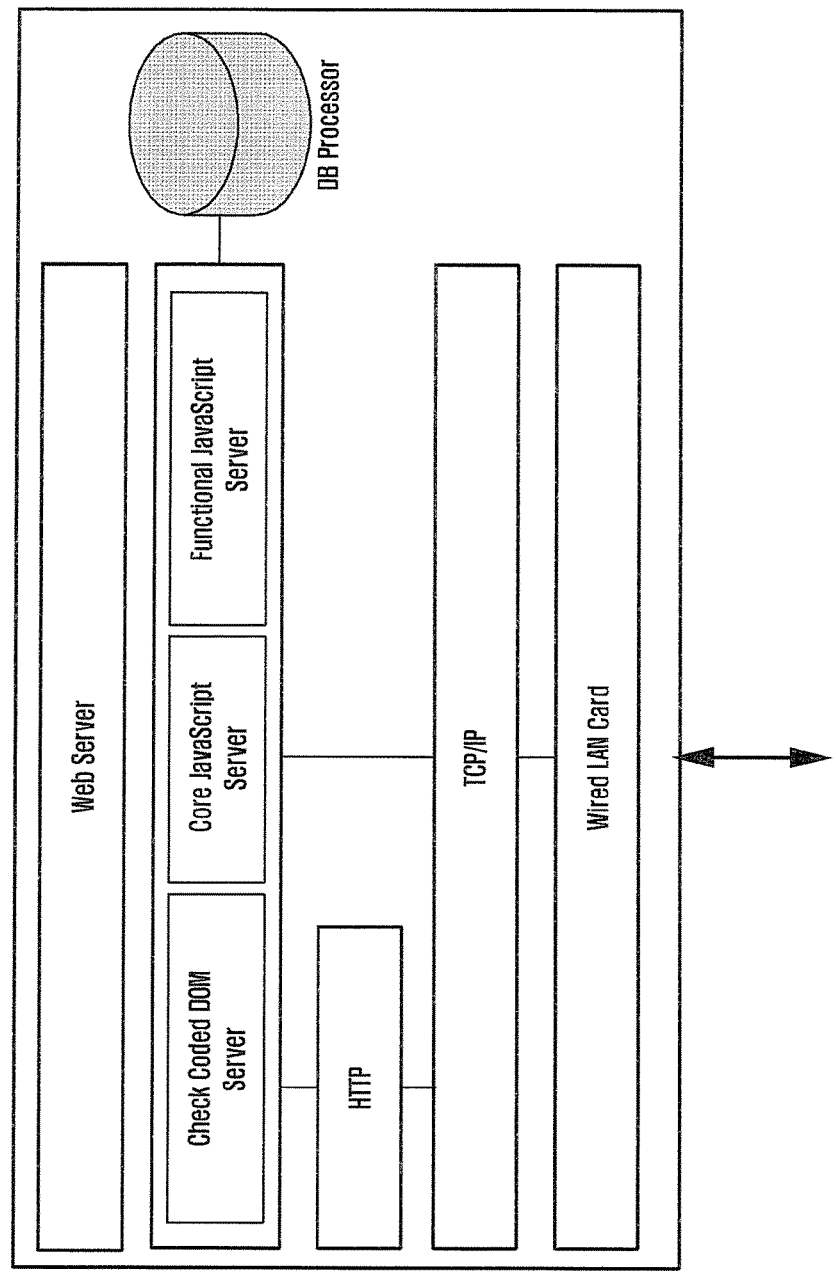
FIG. 11 illustrates a web server according to various embodiments of the present disclosure.

FIG. 11 is a diagram that describes a web server according to various embodiments of the present disclosure. It should be understood that the web server of the present disclosure is not limited to the embodiment of FIG. 11. For example, the web server further includes a controller for controlling the entire operation of the web server and a communication unit for communicating with external network nodes of the web server.

Figure 12:
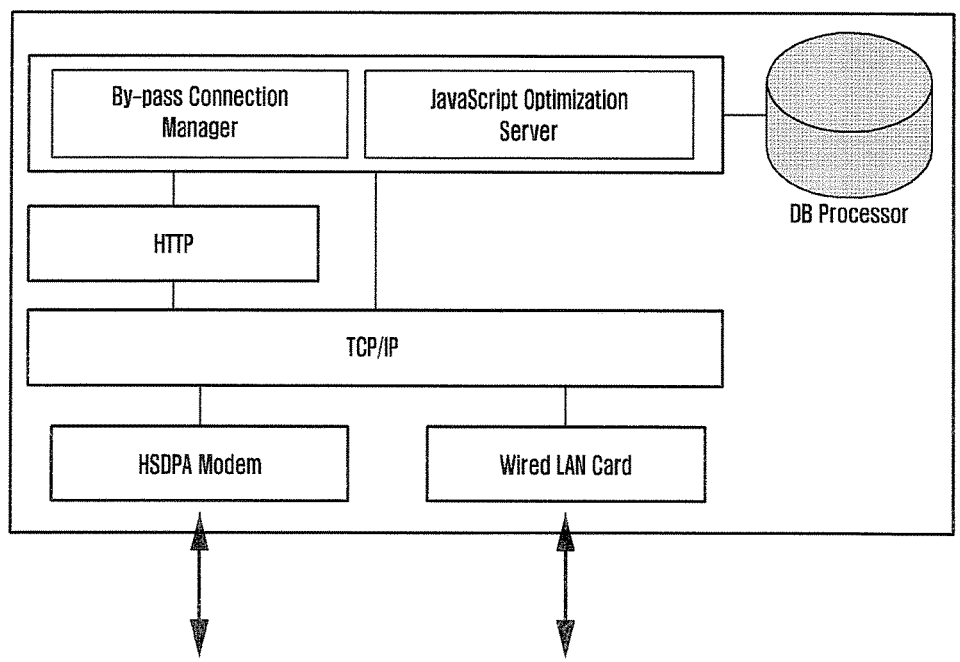
FIG. 12 illustrates a proxy server according to various embodiments of the present disclosure.

FIG. 12 is a diagram that describes a proxy server according to various embodiments of the present disclosure. The proxy server is located on Radio Access Network (RAN), Evolved Packet Core (EPC), Internet, etc. The embodiment of the present disclosure includes a plurality of proxy servers. When a proxy server is located on RAN, it includes an HSDPA modem to be used as a mobile communication base station. The proxy server further includes various types of communication links, e.g., LTE modem, etc.

It should be understood that the proxy server of the present disclosure is not limited to the embodiment of FIG. 12. For example, the proxy server further includes a controller for controlling the entire operation of the proxy server and a communication unit for communicating with external network nodes of the proxy server.

According to embodiments of the present disclosure, in a communication system where the first server, a second server and at least one connection server for connecting the first and second servers are included, the controller of the proxy server may: receive a request for requesting content from at least one client; establish a bypass connection to directly receive data from the second server; directly receive data about the content from the second server by using the bypass connection; and transmit the data to the client. The bypass connection is a by-pass Transmission Control Protocol (TCP) connection that directly receives data from the second server without passing through the connection server. The first and second servers and the connection server are proxy servers.

In addition, the controller of the proxy server: creates bypass connection parameters between proxies, corresponding to at least one of the following: TCP port numbers and IP address of the first server; transmits the created connection parameters to the second server through the connection server; and establishes a bypass connection based on a bypass TCP connection request of the second server.

In addition, the controller of the proxy server receives the data, without passing through the connection server, between the first and second servers. The controller: updates inter-proxy information containing TCP port numbers and IP address of the second server and a content prefix about data received through the bypass connection; and determines whether to use the established bypass connection, according to a content request transmitted from at least one client, based on the inter-proxy information.

In addition, the controller: receives an authentication request message from the second server; transmits an authorization message for authorizing authentication to the second server; receives an access authorization message from the second server; and performs authentication to receive the data from the second server. The controller sets a period of time for maintaining the bypass connection. The bypass connection between the first and second servers is maintained for the set period of time.

In addition, the controller establishes PUSH, also known as a push message, with the second server. When the PUSH is established and content of the second server is changed, the controller receives the changed data by using the bypass connection.

The entities according to embodiments of the present disclosure were described referring to FIGS. 10 to 12, but not limited thereto. The entities are controlled to perform operations shown in FIGS. 13 to 40.

The present disclosure performs five functions to enhance a web performance. A first function: when a web server creates a unique ID for every resource configuring a web page, inserts the resource ID to a web page, and transmits the web page to a client, the client receives the web page and checks whether the resource configuring the web page is changed by using the resource ID.

A second function: when a proxy chain is established with a plurality of proxy server, since a TCP connection between proxy servers not adjacent to each other is additionally created and content is requested and received through the created TCP connection, it is possible to bypass the proxy chain.

A third function: a proxy server optimizes a JAVASCRIPT code, using radio link type, information about hardware and software, and preferred JAVASCRIPT code type of a mobile device, and transmits the optimized JAVASCRIPT code to the mobile device.

A fourth function: when a JAVASCRIPT code of a web server has been modified, information about functions added to/changed in/deleted from the modified JAVASCRIPT code and a JAVASCRIPT function code changed in or added to the modified JAVASCRIPT code, based on the JAVASCRIPT code that is not changed, is transmitted.

A five function: in a state where a JAVASCRIPT code that is expected to be frequently used or that is frequently used has been selected and transmitted to a mobile device, when the mobile device requests the JAVASCRIPT code, the proxy server transmits the JAVASCRIPT code excluding Core JAVASCRIPT and the index information about the excluded code to the client (mobile device).

The first function is performed by Check Coded DOM Client shown in FIG. 10 and Check Coded DOM Server shown in FIG. 11. Check Coded DOM Server creates a unique ID for every resource configuring a web page, inserts the resource ID to a web page, and transmits it to the mobile device in wireless mode. When Check Coded DOM Client receives a web page with the resource ID, it extracts the resource ID, compares the extracted resource ID with a resource ID of the previous web page that it has received, seeks a changed resource, and preforms request for the changed resource. The mobile device includes Previous Resource URL & ID TABLE and Current Resource URL & ID TABLE, shown in FIG. 13, in order to manage resource ID. The detailed operation will be described later.

The second function is performed by By-pass Connection Manager shown in FIG. 12. When a plurality of proxy servers establish a proxy chain, a By-pass TCP connection to bypass the proxy chain is created and bypassing content requested by the mobile device the connection is controlled. The proxy server stores a Proxy-to-Proxy Forwarding Info TABLE shown in FIG. 14, in order to request content by using a By-pass TCP connection, when the proxy server receives an HTTP request message for requesting the content from the mobile device. The table stores the prefix of content received through the By-pass TCP connection and the TCP port number and IP address of the By-pass TCP connection, which are mapped to each other. The detailed operation will be described later.

The third function is performed by JAVASCRIPT Optimization Client shown in FIG. 10 and JAVASCRIPT Optimization Server shown in FIG. 12. This third function is further divided into four functions, called sub-functions for the convenience. A first sub-function is for a proxy server to convert JAVASCRIPT code to Byte code or Native code and to transmit it to a mobile device, considering information about a communication link of the mobile device and a type of JAVASCRIPT code that the mobile device prefers. A second sub-function is for a proxy server to convert, when a script code that a browser of a mobile device does not support is requested, the script code to a code in a script language supported by the browser of the mobile device and to transmit the converted code to the mobile device. To this end, the proxy server stores Supported Language Info TABLE shown in FIG. 15. This table contains information about languages supported by web browsers. A third sub-function is for a proxy server to add, when a mobile device using a low version of browser requests a JAVASCRIPT code that does not run on the low version of browser, the JAVASCRIPT code to the JAVASCRIPT library and to transmit it to the mobile device, so that the JAVASCRIPT code runs on the low version of browser of the mobile device. To this end, the proxy server stores Supported JAVASCRIPT Library Info TABLE shown in FIG. 16. This table contains information about JAVASCRIPT libraries supported by respective browsers, so that the proxy server refers to the table when it inserts a JAVASCRIPT library to a JAVASCRIPT code. A fourth sub-function is an additional process that a proxy server performs when it converts JAVASCRIPT code requested by a mobile device to Byte code or Native code and to transmit it to the mobile device, as the proxy server splits the JAVASCRIPT code to Byte code or Native code and to transmit it to the mobile device.

In order to provide four sub-functions, when JAVASCRIPT Optimization Client shown in FIG. 4 transmits an HTTP request message, it has to write Preferredcontent-processing-type, Preferred-content-processing-info, and Preferred-content-processing-link headers in the message and transmit it; and JAVASCRIPT Optimization Server shown in FIG. 12 optimizes JAVASCRIPT code by using table information and information about headers transmitted from JAVASCRIPT Optimization Client shown in FIG. 10. The detailed operation will be described later.

The fourth function is performed by Functional JAVASCRIPT Client shown in FIG. 10 and Functional JAVASCRIPT Server shown in FIG. 11. When JAVASCRIPT code is created or modified, the Functional JAVASCRIPT Server shown in FIG. 11 creates Function & ID TABLE shown in FIG. 17 and Script & ID TABLE shown in FIG. 18. When Functional JAVASCRIPT Client shown in FIG. 10 requests a JAVASCRIPT code from Functional JAVASCRIPT Server shown in FIG. 11, the server creates Manipulation Info TABLE shown in FIG. 19, and transmits, to the mobile device, an entry of Manipulation Info TABLE where Manipulation attribute is a function code of "New" or "Modified," Script & ID TABLE, and Manipulation Info TABLE. After receiving those from the server, the Functional JAVASCRIPT Client shown in FIG. 10 restores a JAVASCRIPT code by using a previously received JAVASCRIPT code and currently received information. The detailed operation will be described later.

The fifth function is performed by Core JAVASCRIPT Client shown in FIG. 10 and Core JAVASCRIPT Server shown in FIG. 11. The Core JAVASCRIPT Server shown in FIG. 11 extracts JAVASCRIPT code that is expected to be frequently used or that is frequently used as Core JAVASCRIPT. When a mobile device is turned on from a turned-off or sleep state, Core JAVASCRIPT Client shown in FIG. 10 requests and receives Core JAVASCRIPT. When the mobile device requests JAVASCRIPT, Core JAVASCRIPT Server shown in FIG. 11 transmits, to the mobile device, a JAVASCRIPT code removing Core JAVASCRIPT and the index information about the removed code. After receiving those from the server, Core JAVASCRIPT Client shown in FIG. 10 restores a JAVASCRIPT code by using Core JAVASCRIPT, a code excluding Core JAVASCRIPT, and index information about the removed code. The detailed operation will be described later.

A first embodiment according to the present disclosure is described. The first embodiment resolves a trade-off problem between strong cache consistency and network load or server load in the conventional cache consistency scheme. The first embodiment provides an apparatus and method that provides strong cache consistency for resources configuring a web page, reduces the number of transmitting messages to check a cache consistency, and thus reduces network load and a page loading time.

Figure 20:
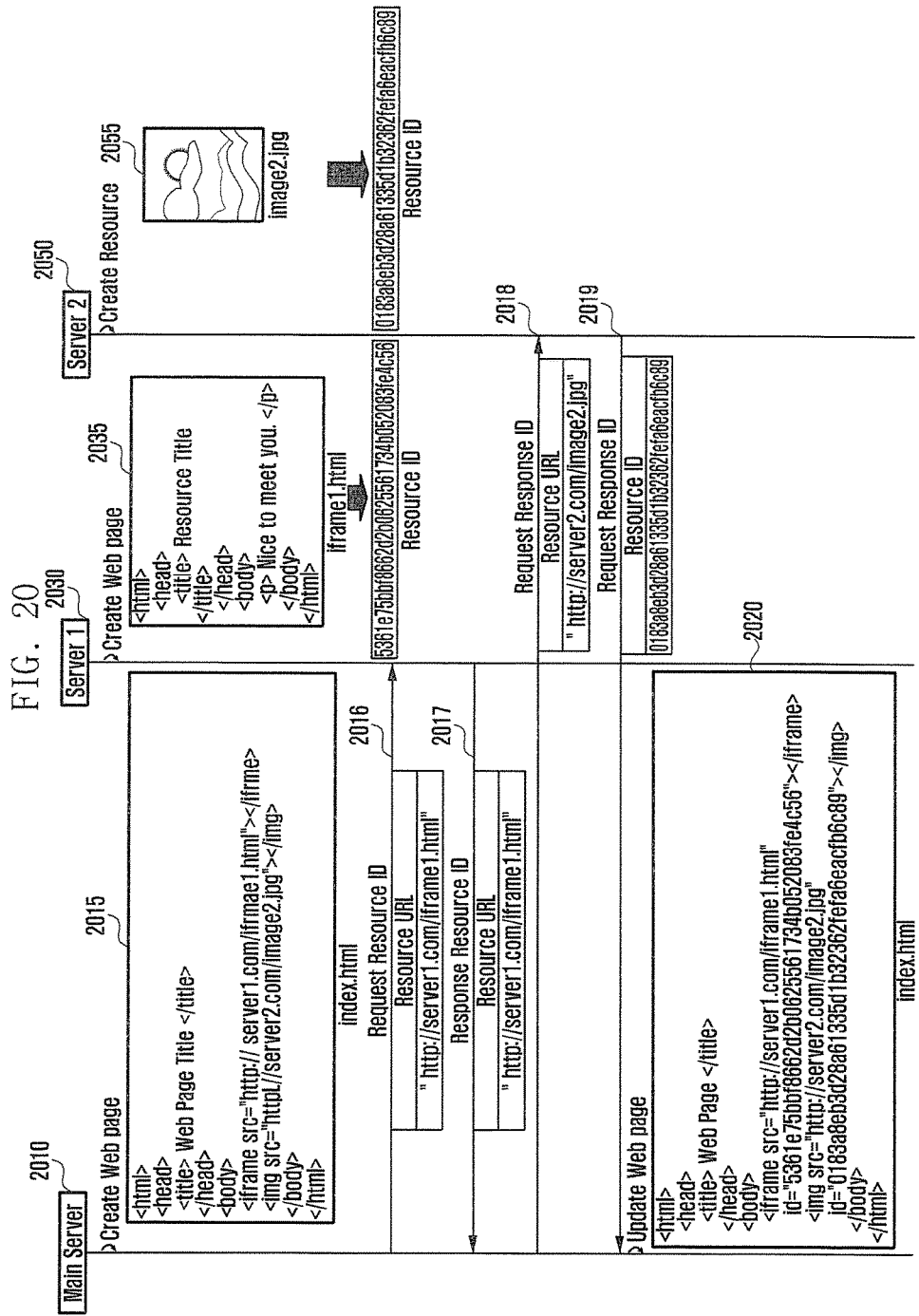
FIG. 20 illustrates a process of creating the initial web page according to a first embodiment of the present disclosure.

FIG. 20 is a diagram that describes a process of creating the initial web page according to a first embodiment of the present disclosure. Referring to FIG. 20, the main server 2010 creates a main web page. In certain embodiments of the present disclosure, resources included in a web page 2015 created by the main server 2010 are html documents and image files. An html document 2035 for a created web page is located on Server 1, indicated by reference number 2030, and an image file 2055 is located on Server 2, indicated by reference number 2050.

Since new resources are created in Server 1 and Server 2, Server 1 and Server 2 create check codes, based on the resource content. Server 1 and Server 2 create check codes by ah SHA-1 algorithm. For example, for html documents, the text content written in the document is used as an input for the SHA-1 algorithm in order to create check codes. For images, binary data of an image is used as an input for the SHA-1 in order to create check codes.

The main server 2010 determines whether resources configuring a web page include a check code. Resources of a web page just created in the main server 2010 do not include a check code. As shown in FIG. 20, the index.html 2015 does not include check codes. Therefore, the main server 2010 requests resource IDs from Server 1 and Server 2 (2016 and 2018). The main server 2010 requests resource IDs by using URLs written in the attribute of respective resources, src. Server 1 and Server 2 respond with a check code for a corresponding resource (2017 and 2019). Server 1 and Server 2 responds with a check code of 20 bytes for a corresponding resource. After receiving check codes of all resources through the responses, the main server 2010 adds an id attribute to DOM objects corresponding to respective resource, and inputs a check code to the id attribute value (2020).

Figure 21A:
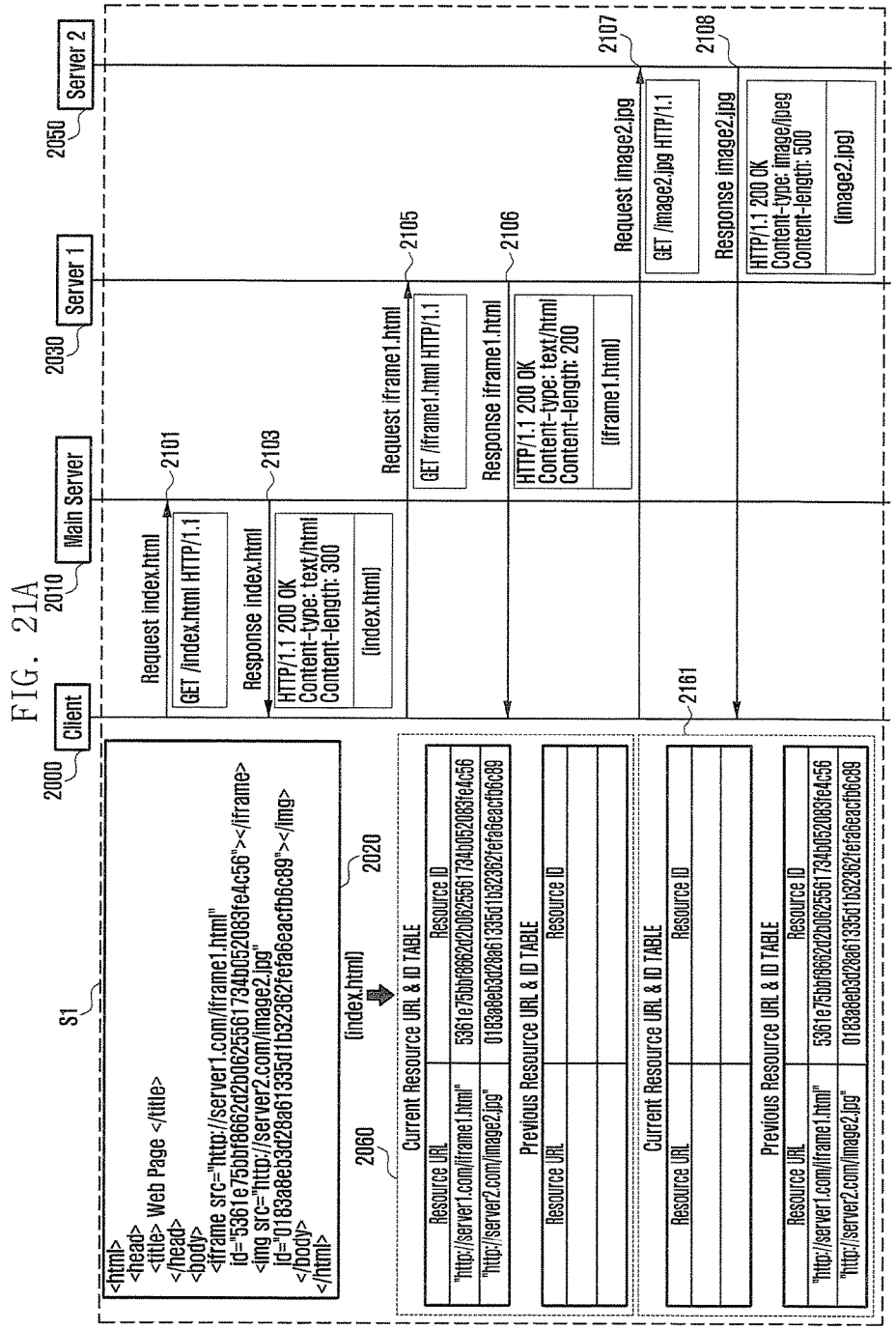
FIGS. 21A and 21B illustrate processes of receiving web pages by a client according to a first embodiment of the present disclosure.
Figure 21B:
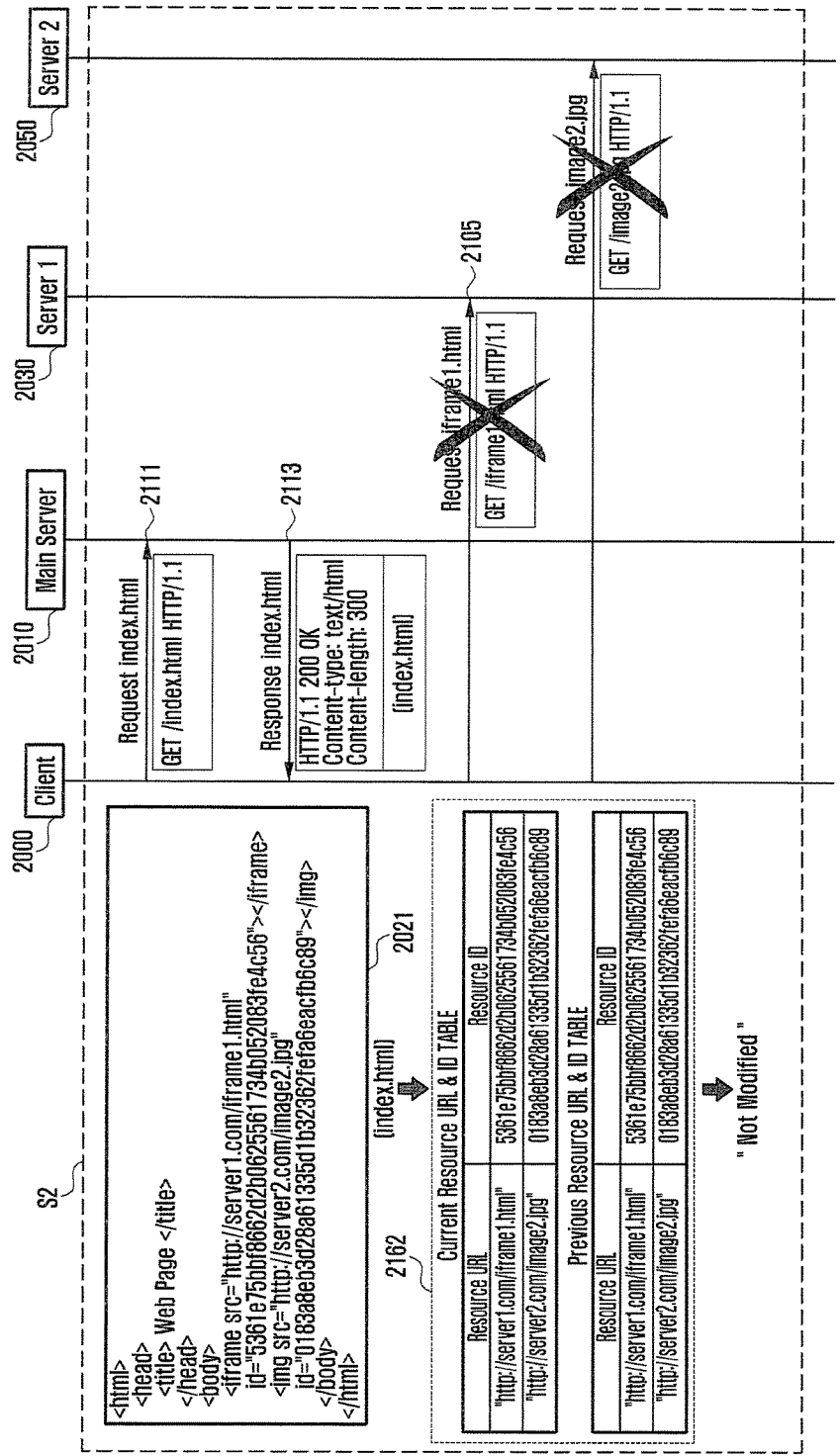

FIGS. 21A and 21B are diagrams that describe a process of receiving web pages by a client according to a first embodiment of the present disclosure. When the main server 2010 has completed a process of creating the initial web page as shown in FIG. 20, the client 2000 requests a main web page and resources configuring a web page and receives the main web page and the resources in response to the request, as shown in FIGS. 21A and 21B.

The client 2000 transmits an HTTP request message to a main server 2010 (2101). The client 2000 receives a main web page containing a check code corresponding to the HTTP request message from the main server 2010. The client 2000 manages a table related to Resource ID and Resource URL of a web page. The table is used to manage information 2060 related to a table for current URL and ID, and a table for previous URL and ID.

The client 2000 stores URL and ID of resources configuring the received web page in Current Resource URL & ID TABLE. After that, the client 2000 determines whether there is any entry consistent with each other between the Previous Resource URL & ID TABLE and the Current Resource URL & ID TABLE. Since the current request is an initial request, the Previous Resource URL & ID TABLE does not include any entry. Therefore, the client 2000 concludes that there is no entry consistent between the two tables. The client 2000 ascertains that it does not include a copy of a resource configuring a web page. The client 2000 requests respective resources configuring web pages and receives the response. The client 2000 transmits an HTTP request message to a server for storing resources configuring web pages, based on information about the received main web page.

The client 2000 transmits: an HTTP request message to Server 1, indicated by reference number 2030, storing html related resources of a web page (2105); and an HTTP request message to Server 2, indicated by reference number 2050, storing image related resources of a web page (2107). The client 2000 receives: a response containing information about html from Server 1 (2106); and a response containing information about images from Server 2 (2108).

After receiving the responses, the client 2000 updates Resource URL & ID Table. For example, the client 2000 moves entries of Current Resource URL & ID TABLE 2161 to Previous Resource URL & ID TABLE; and deletes entries of Current Resource URL & ID TABLE.

As shown in FIG. 21B, block S2 is a process of re-requesting the same web page by the client 2000 in a state where resources are not changed. That is, as shown in FIG. 21A, block S1 is a process of receiving the initial web page. As shown in FIG. 21B, block S2 is a process of receiving a web page when the resources configuring the same web page has not been changed since the initial web page was received.

The client 2000 transmits a request for web page to the main server 2010 (2111). The client 2000 receives a web page 2021 from the main server 2010 (2113). The client 2000 extracts URL and ID of a resource configuring the web page 2021 and adds it to Current Resource URL & ID TABLE as an entry (2162).

The client 2000 compares entries of Previous Resource URL & ID TABLE and Current Resource URL & ID TABLE with each other. The client 2000 seeks resources: that are contained in Current Resource URL & ID TABLE but not in Previous Resource URL & ID TABLE; or that are in both of the tables, while the Resource URLs are identical to each other but the Resource IDs differ from each other.

In the embodiment shown in FIGS. 21A and 21B, since the resources of web pages are not changed, the entries contained in the two tables are identical to each other in terms of Resource URL and Resource ID. Through this, the client 2000 ascertains that the resources have not been changed and thus reuses the previously receive copy without asking whether resources have been changed. Therefore, the client 2000 may not transmit an HTTP request message to Server 1 or Server 2.

Figure 22:
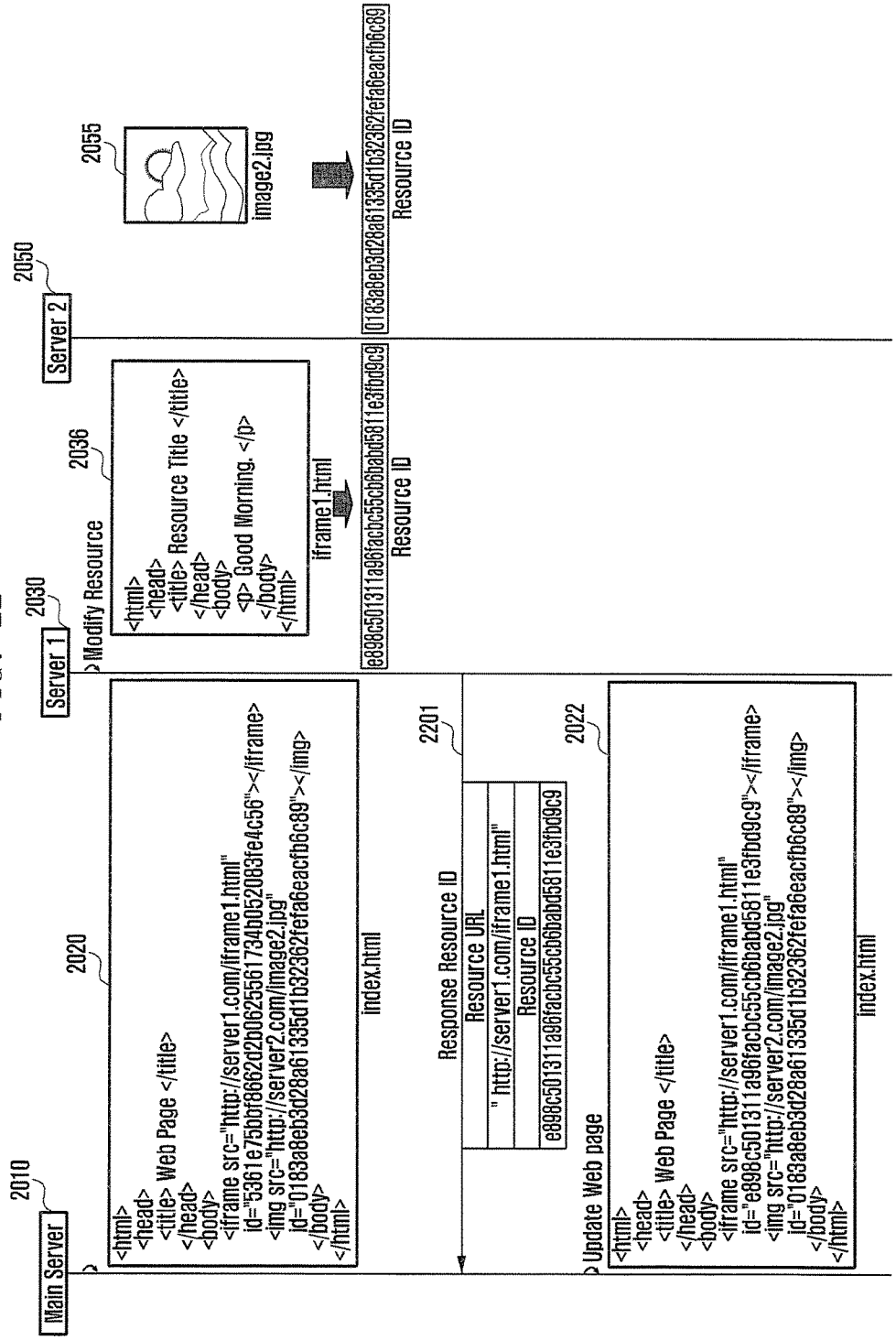
FIG. 22 illustrates a process of modifying web pages when changing in resources according to a first embodiment of the present disclosure.

FIG. 22 is a diagram that describes a process of modifying web pages when changing in resources according to a first embodiment of the present disclosure. In the embodiment of FIG. 22, it is assumed that only the resources of Server 1 are changed in a web page identical to that of the embodiment of FIGS. 21A and 21B. When the resources of Server 1, indicated by reference number 2030, are changed (2036), Server 1 creates a new check code by using SHA-1 algorithm. When the check code is changed, Server 1 transmits URL and ID of the corresponding resource to the main server 2010 (2201). After receiving the changed check code, the main server 2010 modifies a check code of a web page (2022).

Figure 23:
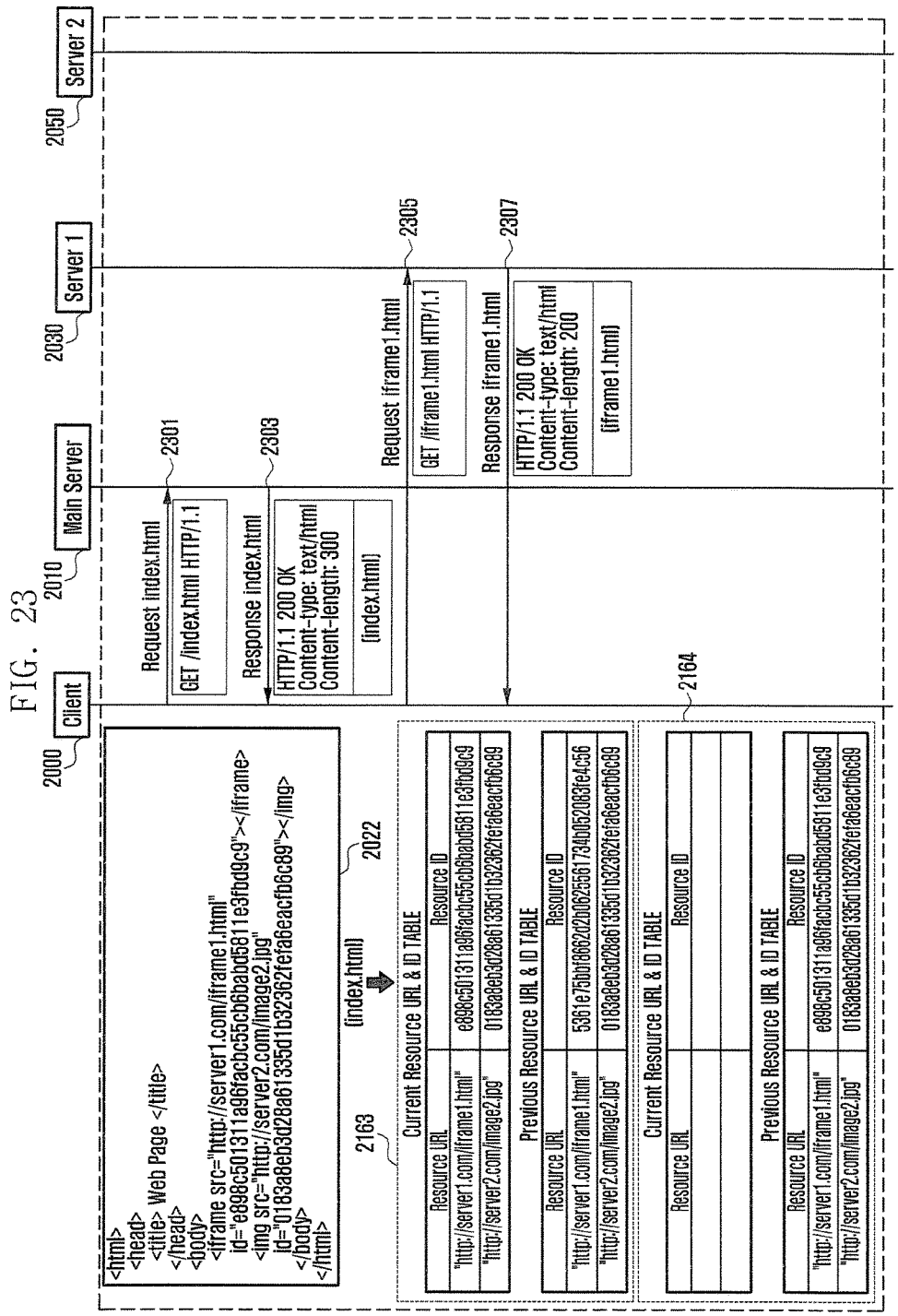
FIG. 23 illustrates a process of receiving web pages by a client according to a first embodiment of the present disclosure.

FIG. 23 is a diagram that describes a process of receiving web pages by a client according to a first embodiment of the present disclosure. In the embodiment of FIG. 23, the resources of Server 1 are changed in a web page identical to that of the embodiment of FIGS. 21A and 21B. After changing the check code of a web page as described above referring to FIG. 22, the client 2000 requests the same web page as FIG. 21 from the main server 2010 (2301). Since the web page has been updated as described above referring to FIG. 22, the client 2000 receives a web page 2022 where the check code has been changed from the main server 2010 (2303).

The client 2000 extracts URL and ID of resources from a web page and adds the extracted URL and ID to the entry of Current Resource URL & ID TABLE. As the process of receiving a previous web page, the client 2000 compares entries of Previous Resource URL & ID TABLE and Current Resource URL & ID TABLE with each other. The client 2000 seeks resources: that are contained in Current Resource URL & ID TABLE but not in Previous Resource URL & ID TABLE; or that are in both of the tables, while the Resource URLs are identical to each other but the Resource IDs differ from each other.

In the embodiment of FIG. 23, since only the html related resources of Server 1 are changed, the two tables show that the resource URLs are identical to each other but the resource IDs are changed. This means that the resource of Server 1 has been changed. The resource of Server 2 is not changed because the resource IDs are identical to each other.

The client 2000 transmits, to Server 1, an HTTP request message for requesting the resource of Server 1 from among the resources configuring web pages (2305). The client 2000 receives the changed resource from Server (2307).

After receiving the resource from Server 1, the client 2000 moves entries of Current Resource URL & ID TABLE 2164 to Previous Resource URL & ID TABLE; and deletes all the entries of Current Resource URL & ID TABLE.

A second embodiment according to the present disclosure is described. The second embodiment resolves problems in conventional proxy chains, i.e., a transmission delay that occurs as an HTTP message is transmitted through a plurality of proxy servers and the load centralization in a particular proxy server providing web caches. The second embodiment additionally creates Transmission Control Protocol (TCP) connection between proxy servers not adjacent to each other, on proxy chains established by a plurality of proxy servers, and performs request and reception of content through the TCP connection, thereby bypassing the proxy chains. When a proxy server adjacent to a client receives an HTTP request message from the client, it equally redirects it to the other proxy servers, thereby distributing the load. In the second embodiment, Proxy A is called a first server and Proxy E is called a second server. Proxy A and Proxy E may also be called a target server for bypass connection, each other. A bypass connection between proxies is applied to a case where proxies are managed by the same proxy service proving company, a case where proxies are managed by different proxy service proving companies, a case where proxy service providing companies make an arrangement for bypass connection, etc.

Figure 24A:
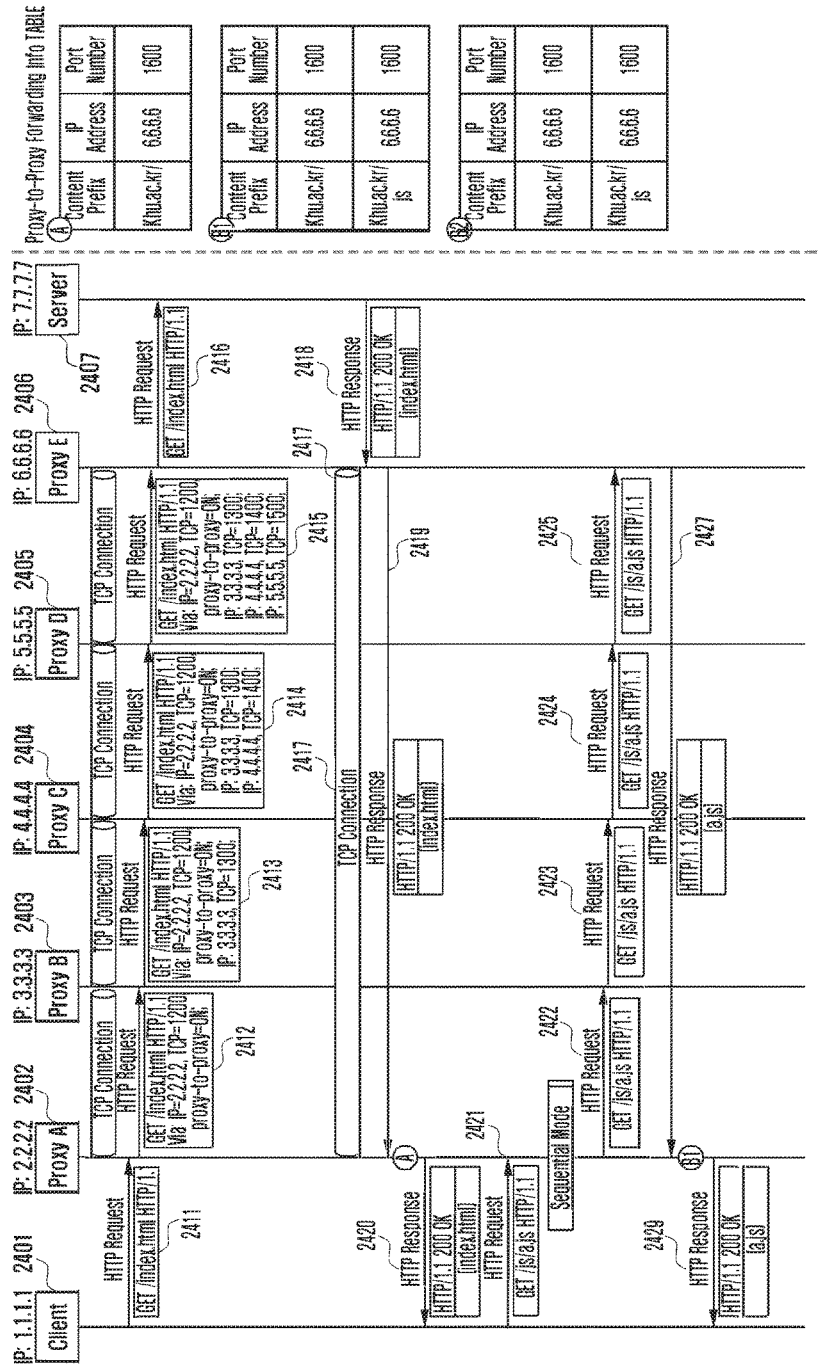
FIGS. 24A and 24B illustrate a method of receiving a web page using By-pass TCP connection according to a second embodiment of the present disclosure.
Figure 24B:
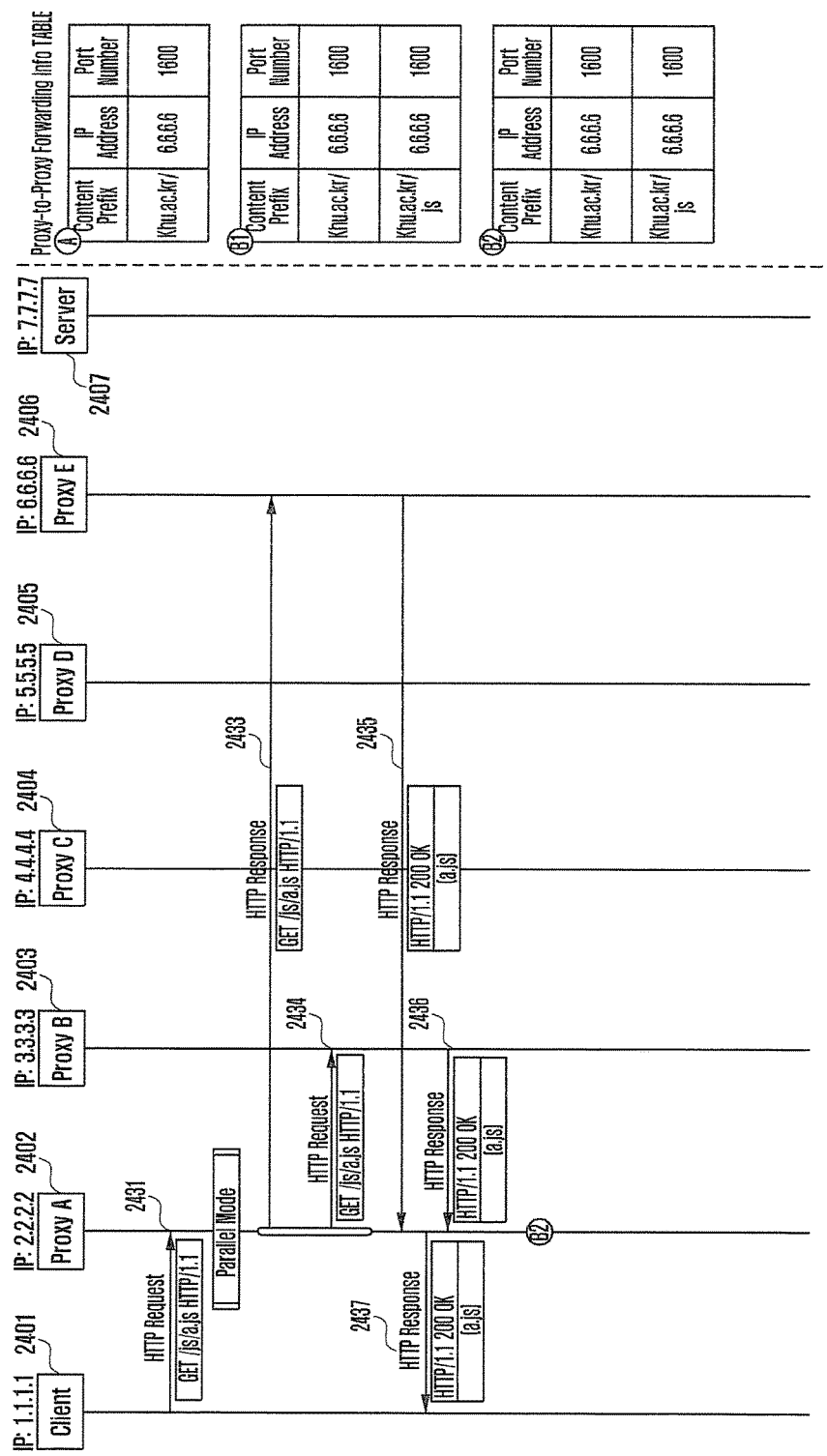

FIGS. 24A and 24B are diagrams that describe a method of receiving a web page using By-pass TCP connection according to a second embodiment of the present disclosure. Referring to FIGS. 24A and 24B, on a network where a proxy chain has been established, a client 2401 establishes a By-pass TCP connection with making a request for a web page. In the second embodiment, Proxy A, indicated by reference number 2402, and Proxy E, indicated by reference number 2406, intend to establish a By-pass TCP connection therebetween.

The client 2401 transmits an HTTP request message to Proxy A (2411). Proxy A creates a Via header in the HTTP request message from the client 2401, and writes its IP address and TCP port number to be used to establish a By-pass TCP connection. Proxy A also adds "proxy-to-proxy=ON" to the HTTP request message in order to inform that it will establish a By-pass TCP connection. If Proxy A does not intend to establish a By-pass TCP connection, it does not add "proxy-to-proxy=ON" to the HTTP request message. The HTTP request message modified by Proxy A is transmitted to Proxy B (2412).

Proxy B adds its IP address and TCP port number to the "Via" header of the received HTTP request message. Since Proxy B does not intend to establish a By-pass TCP connection (which is assumed in the second embodiment), it does not add "proxy-to-proxy=ON" for its IP address and TCP port number to the received HTTP request message. The HTTP request message modified by Proxy B, indicated by the reference number 2403, is transmitted to Proxy C indicated by reference number 2404 (2413). That is, the modified HTTP request message is in a state of "proxy-to-proxy=ON" only for Proxy A.

These processes are repeated for Proxy C and Proxy D, indicated by reference numbers 2404 and 2405 respectively, (2413 and 2414), until the HTTP request message is transmitted to the last proxy server, Proxy E indicated by reference number 2406. Proxy E establishes a By-pass TCP connection with the IP address and TCP port number, containing "proxy-to-proxy=ON" of the "Via" header values of the HTTP request message (2415). That is, since the HTTP request message containing a message of "proxy-to-proxy=ON" for the IP address and TCP port number of Proxy A, Proxy E establishes a By-pass TCP connection with Proxy A. The By-pass TCP connection between Proxy A and Proxy E also be established by a direct connection request by Proxy E and the response by Proxy A. Proxy E establishes a By-pass TCP connection and then transmits the HTTP request message to a web server 2407 (2416).

Proxy E receives the HTTP response message from the web server 2407 (2418). Proxy E forwards the HTTP response message not to the adjacent proxy server, Proxy D, but through the By-pass TCP connection established with Proxy A (2419). Proxy A forwards the HTTP response message from the Proxy E to the client 2401 (2420).

Proxy A includes Proxy-to-Proxy Forwarding Info TABLE. The Proxy-to-Proxy Forwarding Info TABLE stores Content Prefix for content transmitted through the By-pass TCP connection, and the IP address and TCP port number of proxy server that has received the content. When receiving an HTTP request message for requesting content from the client 2401, the proxy server uses the table to determine whether it forwards the HTTP request message through Proxy Chain or By-pass TCP connection. When Proxy A needs to receive web content corresponding to the HTTP request message of the client 2401 via a proxy with which the By-pass TCP connection has been established, it forwards the HTTP request message to the proxy.

In the following description, an HTTP request and response using a By-pass TCP connection is explained. Sequential mode and parallel mode are described as follows.

A method of requesting content through a By-pass TCP connection in sequential mode is performed as follows. The client 2401 transmits an HTTP request message for content to Proxy A (2421).

Since Proxy A runs in sequential mode, it determines whether an entry for Content Prefix of content requested by the client 2401 is contained in Proxy-to-Proxy Forwarding Info TABLE, referring to the table. When Proxy A ascertains that an entry for Content Prefix of content requested by the client 2401 is contained in the Proxy-to-Proxy Forwarding Info TABLE, it forwards the HTTP request message through the By-pass TCP connection corresponding to the Content Prefix, thereby bypassing the Proxy Chain. When Proxy A ascertains that an entry for Content Prefix of content requested by the client 2401 is not contained in the Proxy-to-Proxy Forwarding Info TABLE, it forwards the HTTP request message to the adjacent proxy server, Proxy B.

The embodiment of FIGS. 24A and 24B shows a case where, at a time point that Proxy A receives an HTTP request message from the client 2401 (2421), the prefix for content requested by the client 2401 does not exist on the Proxy-to-Proxy Forwarding Info TABLE. Proxy A forwards the HTTP request message to Proxy B (2422). Since it is assumed that the content requested by the client 2401 is located in Proxy E, the HTTP request message is forwarded to Proxy E through the Proxy Chain (2423, 2424, and 2425). Proxy A and Proxy E have established the By-pass TCP connection with each other in operation 2417. Therefore, Proxy E transmits the HTTP response message containing content to Proxy A through the established By-pass TCP connection (2427)

After receiving the HTTP response message, Proxy A adds Prefix for the received content and the IP address and TCP port number of the proxy server that has received the content to Proxy-to-Proxy Forwarding Info TABLE (B1). While performing the addition to Proxy-to-Proxy Forwarding Info TABLE, Proxy A simultaneously transmits the HTTP request message, containing content transmitted from Proxy E, to the client 2401 (2429).

The information about content that the client 2401 requested in operations 2411 and 2421 is stored in the Proxy-to-Proxy Forwarding Info TABLE (B1). When the client 2401 requests the same content as it requested in operations 2411 and 2421 from Proxy A, Proxy A forwards the HTTP request message to and receives the response message from Proxy E through the By-pass TCP connection established with Proxy E.

A method of requesting content through a By-pass TCP connection in parallel mode is performed as follows referring to FIG. 24B. The client 2401 transmits an HTTP request message for content to Proxy A (2431).

Since Proxy A runs in parallel mode, it simultaneously transmits an HTTP request message to the adjacent proxy server, Proxy B, and Proxy E that has established a By-pass TCP connection (2433 and 2434). The embodiment shown in FIG. 24B shows a case, assuming that Proxy B and Proxy E store content requested by the client 2401. After receiving the HTTP request message from Proxy A, Proxy B and Proxy E transmit the HTTP response messages containing content to Proxy A (2435 and 2436). After receiving the HTTP response messages containing content, Proxy A (2402) updates Proxy-to-Proxy Forwarding Info TABLE and simultaneously forwards the received HTTP response message containing content to the client 2401 (2437). Proxy A forwards, to the client 2401, any one of the HTTP response messages from Proxy B and Proxy B that it received earlier than the others.

Figure 25:
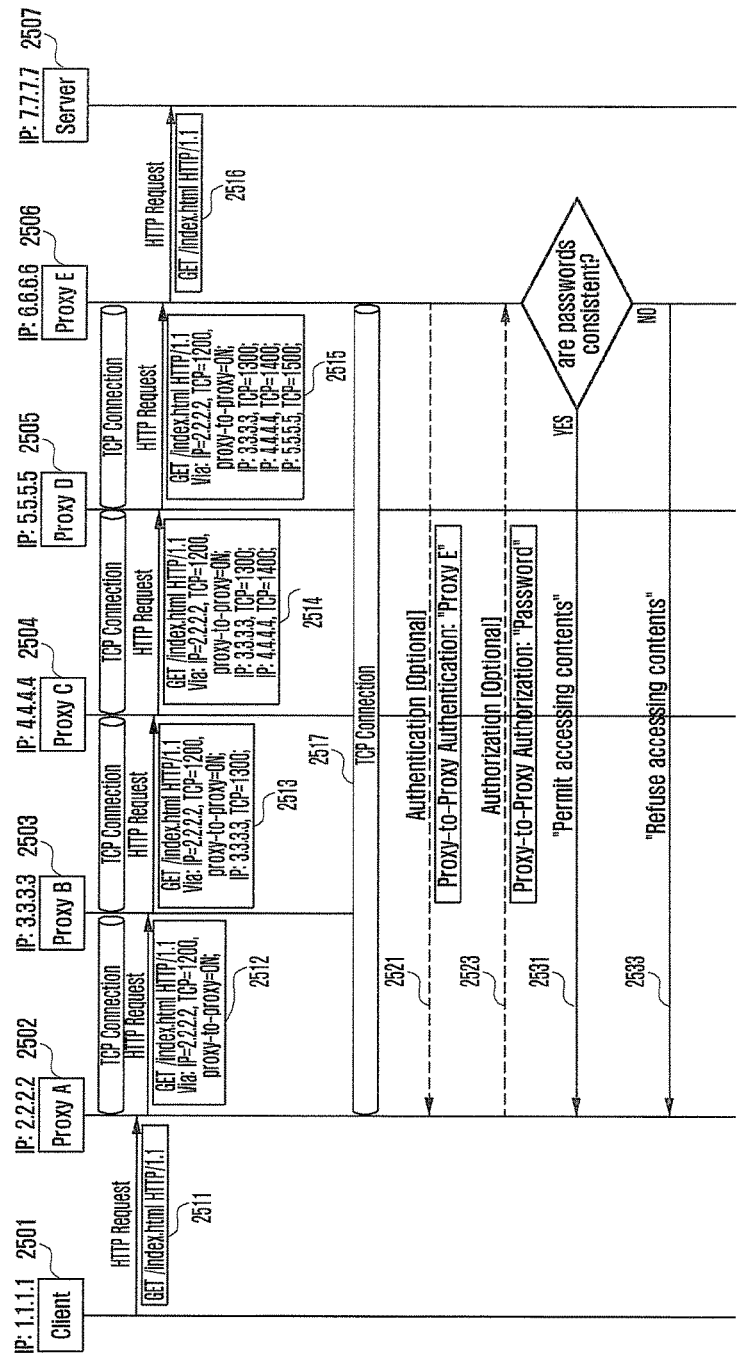
FIG. 25 illustrates a method of performing authentication between proxy servers according to a second embodiment of the present disclosure.

FIG. 25 is a diagram that describes a method of performing authentication between proxy servers according to a second embodiment of the present disclosure. Referring to FIG. 25, a detailed description is provided about the method of performing authentication to access content by proxy servers that have established a By-pass TCP connection with each other. The authentication process is selectively performed after a By-pass TCP connection has been established (2517). Since operations 2511 to 2517 shown in FIG. 25 correspond to operations 2411 to 2417 shown in FIG. 24A, the detailed description is omitted bellows.

Proxy E, indicated by reference number 2506, transmits a message for requesting authentication to access content, Authentication, to Proxy A indicated by reference number 2502 (2521). The Authentication message includes a Proxy-to-Proxy Authentication header and is transmitted with the name of the proxy server that requests authentication, written therein. After receiving the Authentication, Proxy A writes a password in the Proxy-to-Proxy Authorization header of an Authorization message to obtain an authorization to access content, and transmits the Authorization message to Proxy E indicated by reference number 2506 (2523).

After receiving the Authorization, Proxy E determines whether the password transmitted from Proxy A is correct. When Proxy E ascertains that the password transmitted from Proxy A is consistent with a correct password, it transmits a message "Permit accessing content" to Proxy A, thereby informing Proxy A that it permits Proxy A to access content of Proxy E through the By-pass TCP connection (2531). When Proxy E ascertains that the password transmitted from Proxy A is not consistent with a correct password, it transmits a message "Refuse accessing content" to Proxy A, thereby informing Proxy A that it does not permit Proxy A to access content of Proxy E through the By-pass TCP connection (2533).

Figure 26:
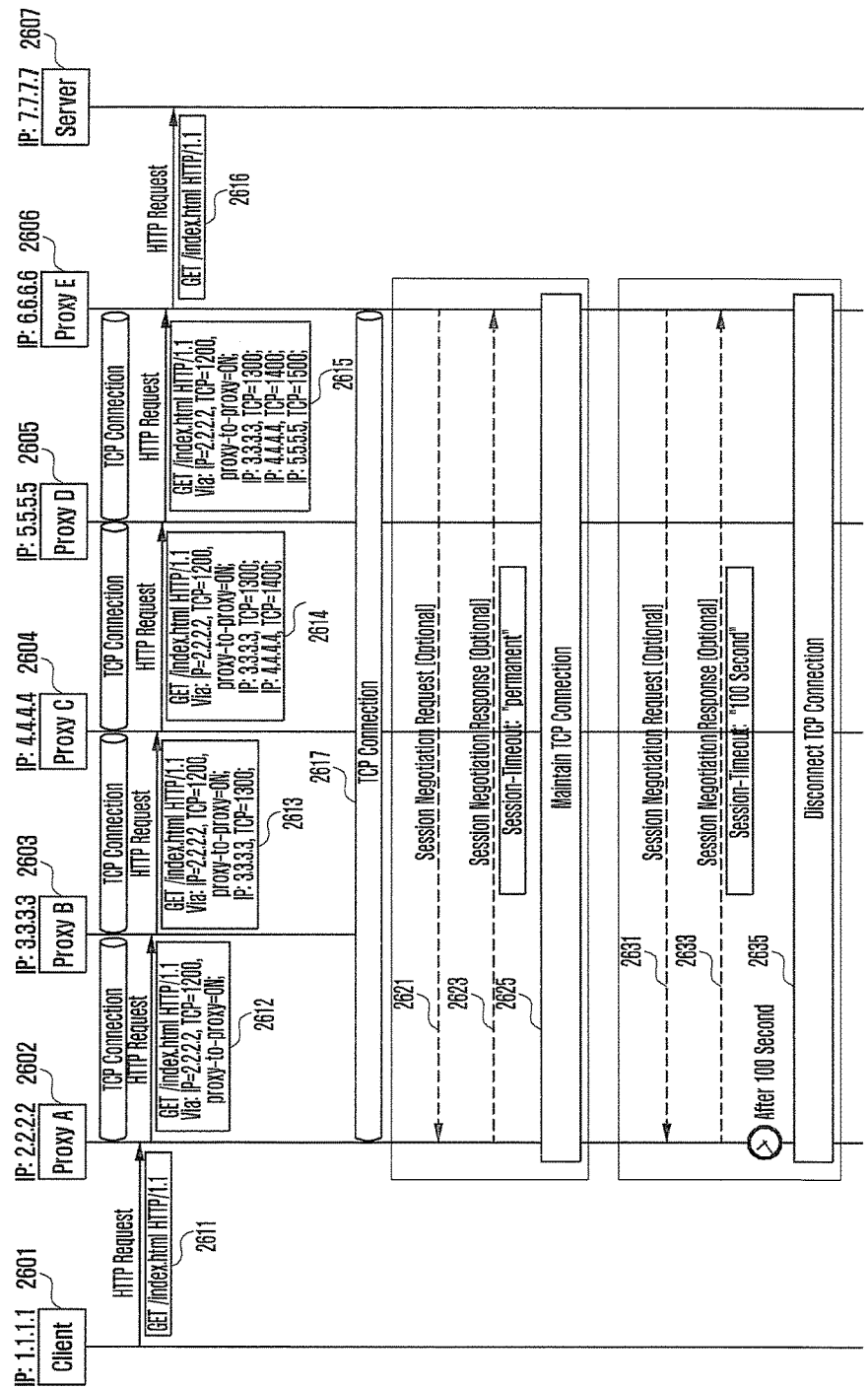
FIG. 26 illustrates a method of setting a connection time between proxy servers according to a second embodiment of the present disclosure.

FIG. 26 is a diagram that describes a method of setting a connection time between proxy servers according to a second embodiment of the present disclosure. Referring to FIG. 26, a detailed description is provided about the method of negotiating a period of time for maintaining a By-pass TCP connection established to bypass Proxy Chain. The negotiation process is selectively performed after a By-pass TCP connection has been established (2617). Since operations 2611 to 2617 shown in FIG. 26 correspond to operations 2411 to 2417 shown in FIG. 24A, the detailed description is omitted bellows.

Proxy E indicated by reference number 2606 transmits, to Proxy A indicated by reference number 2602, a Session Negotiation Request message for requesting the negotiation of a period of time for maintaining a By-pass TCP connection (2621). After receiving the request message, Proxy A writes "permanent" in the Session-Timeout header of the Session Negotiation Response message in order to maintain a By-pass TCP connection and transmits the response message to Proxy E indicated by reference number 2606 (2623). Proxy E maintains the By-pass TCP connection (2625).

Proxy A maintains the By-pass TCP connection only for a specific period of time for a case as follows. Proxy E transmits the Session Negotiation Request message described in operation 2621 to Proxy A (2631). In order to maintain the By-pass TCP connection only for a specific period of time, Proxy A writes the period of time for maintaining By-pass TCP connection in the Session-Timeout header of the Session Negotiation Response message and transmits the message to Proxy E (2633). In the embodiment of FIG. 26, the period of time for maintaining the By-pass TCP connection is requested to be set to 100 seconds. Proxy A writes "100 Second" in the Session-Timeout header of the Session Negotiation Response and transmits the message to Proxy E in operation 2633. Proxy E disconnects the By-pass TCP connection with Proxy A after 100 seconds has elapsed from the time point that it received the Session Negotiation Response. Meanwhile, the period of time for maintaining a By-pass TCP connection is requested when Proxy E sets the Session Negotiation Request message.

Figure 27:
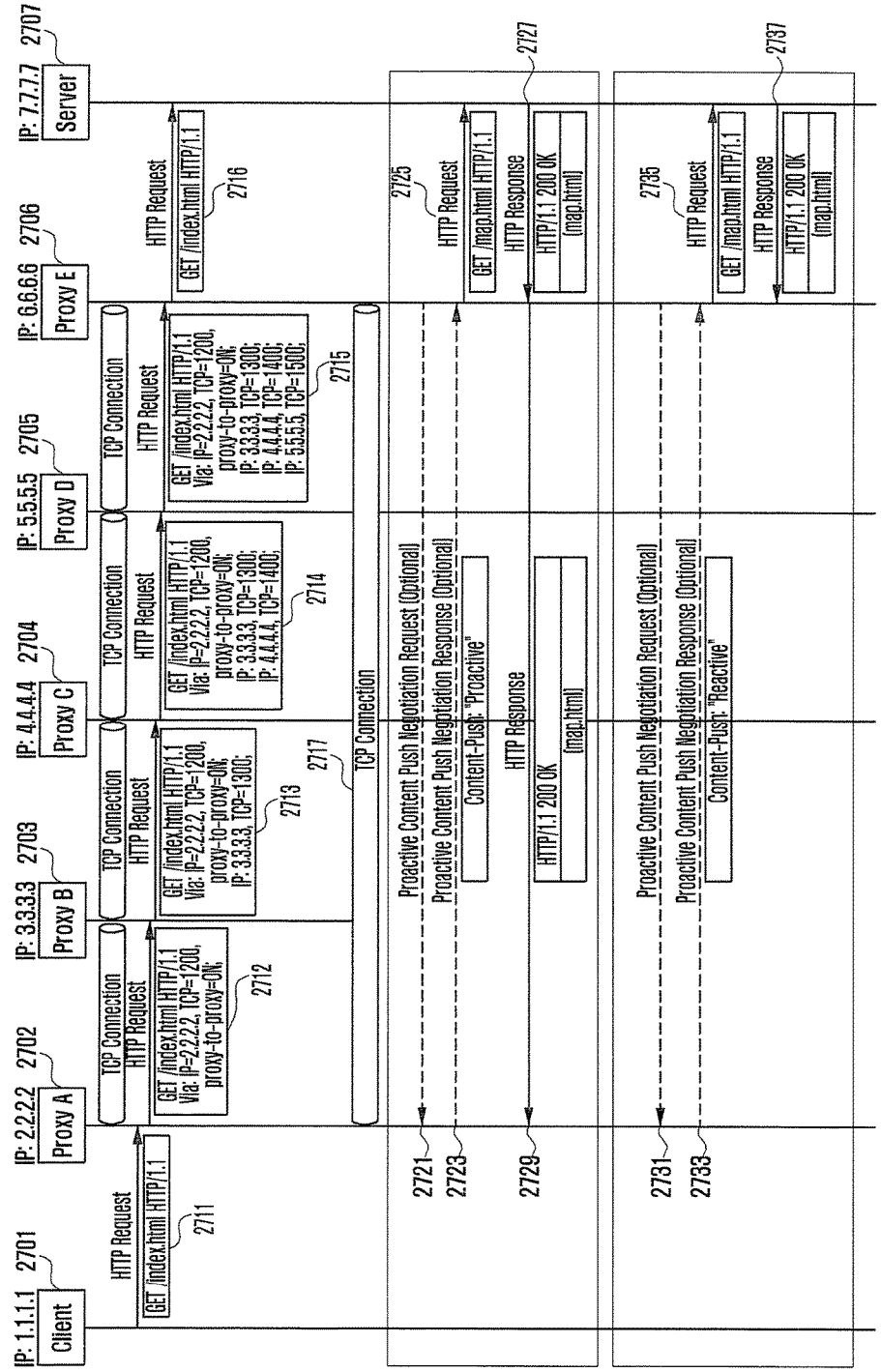
FIG. 27 illustrates a method of establishing Content Push between proxy servers according to a second embodiment of the present disclosure.

FIG. 27 is a diagram that describes a method of establishing Content Push between proxy servers according to a second embodiment of the present disclosure. Referring to FIG. 27, a detailed description is provided about the method of negotiating Content Push between proxy servers which a By-pass TCP connection has been established with each other. The negotiation process is selectively performed after a By-pass TCP connection has been established (2717). Since operations 2711 to 2717 shown in FIG. 27 correspond to operations 2411 to 2417 shown in FIG. 24A, the detailed description is omitted bellows.

Proxy E indicated by reference number 2706 transmits a request message, Proactive Content Push Negotiation Request, to Proxy A indicated by reference number 2702, in order to inquire whether Proxy A receives Content Push (2721). After receiving the request message, Proxy A writes "Proactive" in the Content-Push header of the Proactive Content Push Negotiation Response message and transmits the message to Proxy E indicated by reference number 2706 (2723).

Since Proxy E received the Proactive Content Push Negotiation Response in which the Content-Push header is "Proactive," it pushes its content to Proxy A through the By-pass TCP connection each time that its content is changed. When the content of Proxy E is changed through processes where Proxy E receives a request for content from a third mobile device or proxy server and transmits the content thereto, Proxy E pushes the changed content to Proxy A (2729).

If a client writes "Reactive" in the Content-Push header of the Proactive Content Push Negotiation Response message and transmits the message to Proxy E (2733), although the content of Proxy E is changed through processes where Proxy E receives a request for content from a third mobile device or proxy server and transmits the content thereto, Proxy E does not push content to Proxy A.

As described above referring to FIGS. 25, 26 and 27, although the embodiments were described in such a way that the processes of authentication, setup of a connection maintaining time, and establishment of Push are triggered by Proxy E, it should be understood that the disclosure is not limited to the embodiments. The embodiments are modified in such a way that those processes are triggered by Proxy A. It will be easily appreciated that functions of Proxy E are performed by Proxy A.

A third embodiment according to the present disclosure is described. The third embodiment resolves a problem that a JAVASCRIPT code is not optimized, considering a communication status and a network status. The third embodiment allows a proxy server to convert JAVASCRIPT code to Byte code or Native code, according to a communication link type of mobile device and to transmit it to the mobile device.

When script languages supported by types of web browsers differ from each other, the third embodiment allows a proxy server to convert one script code in a script language to another script code in a script language supported by a web browser of a client and to transmit it to the client. When script libraries supported by a web browser differ from each other according to the versions, the third embodiment allows a proxy server to convert one script code to another script code that can be executed by low versions of a web browser and to transmit it to the client.

Figure 28:
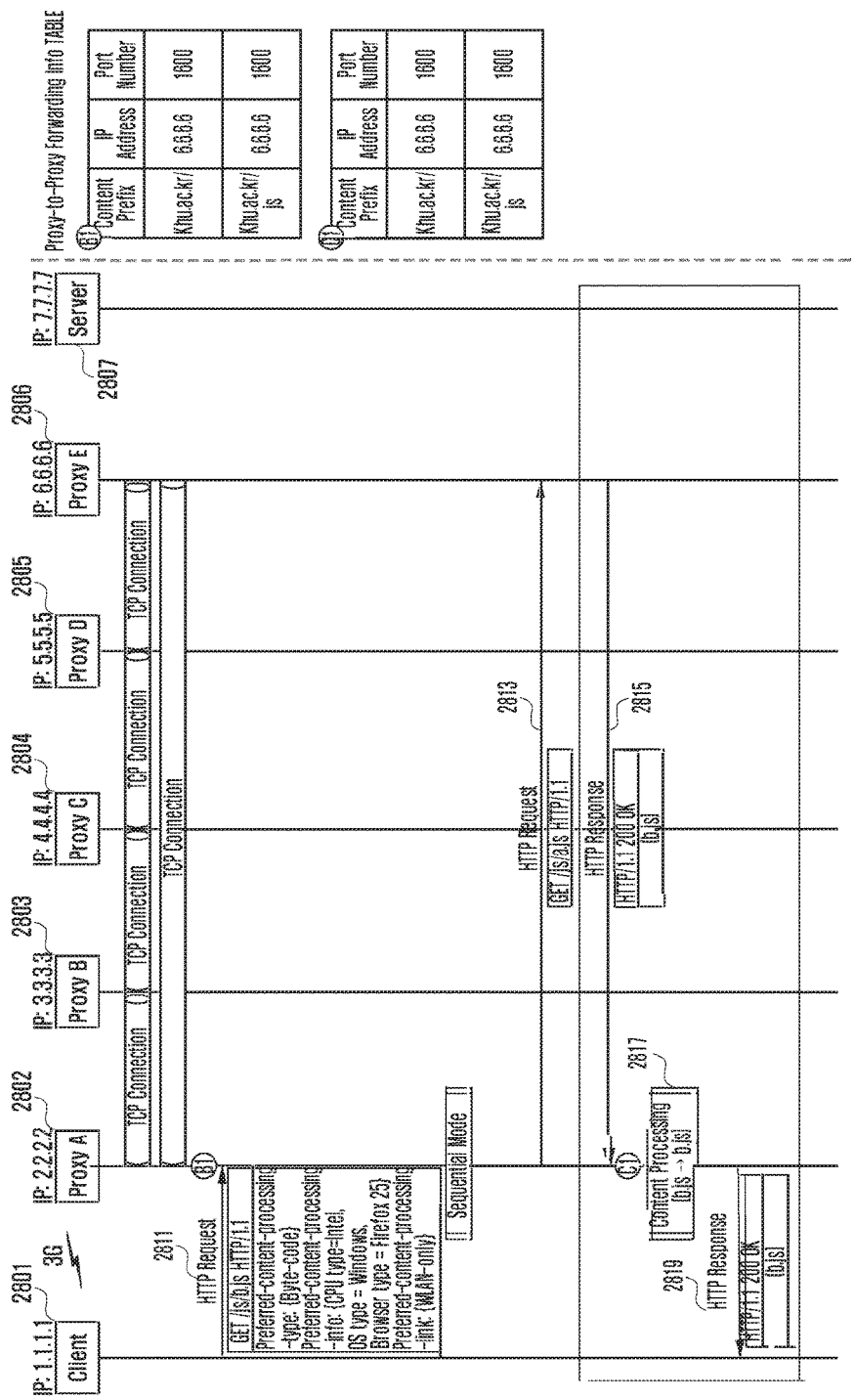
FIGS. 28 and 29 illustrate a method of performing conversion and transmission of script code a according to a third embodiment of the present disclosure.
Figure 29:
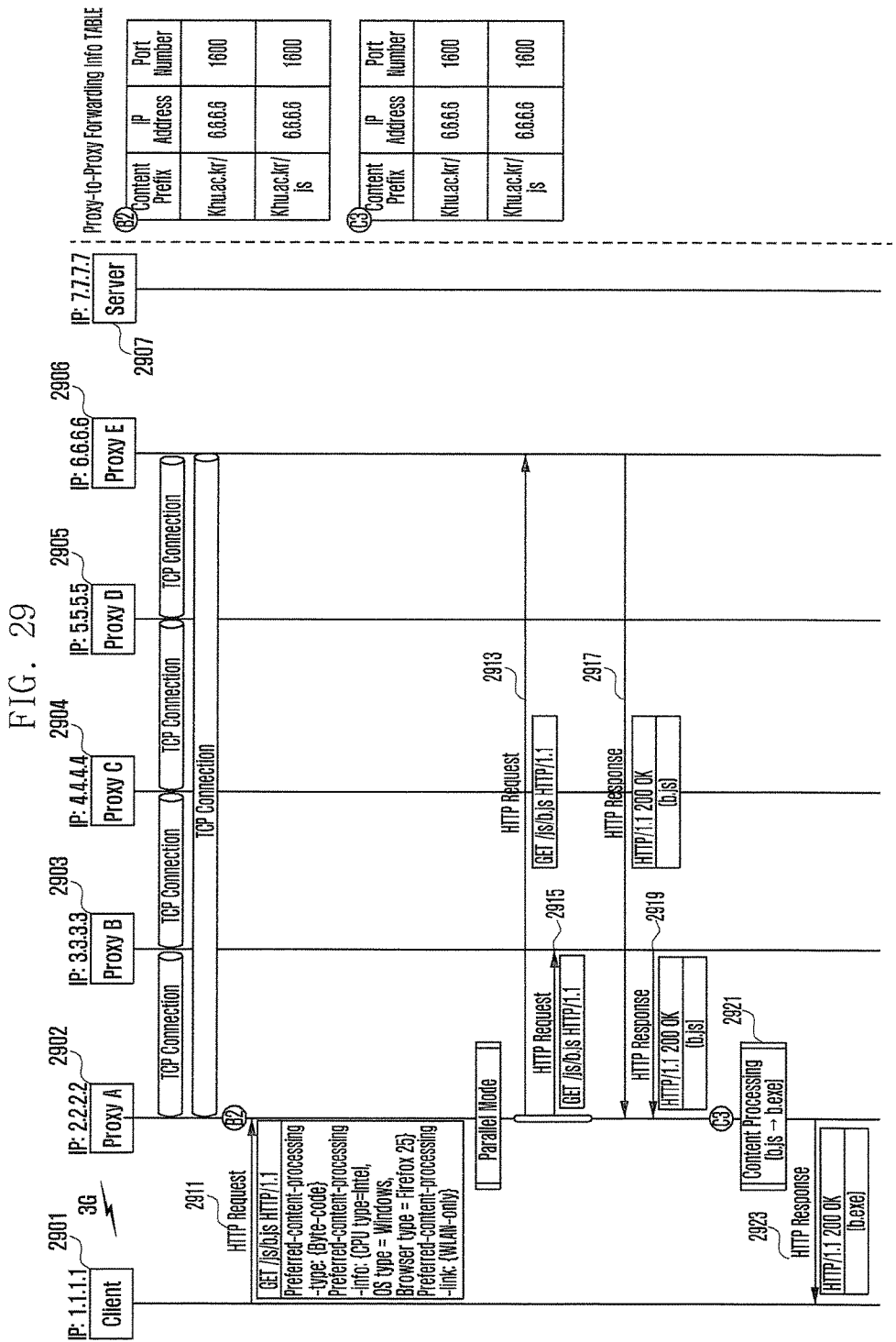

FIGS. 28 and 29 are diagrams that describe a method for a proxy server to convert JAVASCRIPT code to Byte code or Native code, according to communication links of a client, and to transmit it to the client. Referring to FIG. 28, the client 2801 requests a JAVASCRIPT code through 3G mobile network and receives not Byte code or Native code but a JAVASCRIPT source code, as it is, from Proxy A indicated by reference number 2802.

The client 2801 requests a JAVASCRIPT code by using an HTTP request message (2811). The client 2801 adds Preferred-content-processing-type, Preferred-content-processing-info, and Preferred-content-processing-link headers to the HTTP request message and transmits the message to Proxy A.

Proxy A performs request and reception of JAVASCRIPT in sequential mode (2813 and 2815). Proxy A determines which type of code the received JAVASCRIPT is converted to and transmitted to the client 2801, by using the information about the Preferred-content-processing-type, Preferred-content-processing-info, and Preferred-content-processing-link headers (2817).

When the Preferred-content-processing-link header is WLAN-only, it means that Proxy A performs conversion for a JAVASCRIPT code only when a communication link of the client is WLAN. Since the client 2801 uses a 3G mobile network in the embodiment of FIG. 28, Proxy A does not convert a JAVASCRIPT code to Byte code or Native code, but transmits the JAVASCRIPT source code, as it is, to the client 2801 (2819).

When the client 2801 uses WLAN as the communication link as shown in FIG. 28, it operates as follows. The client 2801 transmits an HTTP request message for requesting a JAVASCRIPT code to Proxy A. Proxy A performs request and reception of a JAVASCRIPT code in sequential mode.

Since the Preferred-content-processing-link header of the HTTP request message transmitted from the client 2801 is WLAN-only, Proxy A have received JAVASCRIPT and then converts the JAVASCRIPT code to Byte code or Native code by using Preferred-content-processing-type and Preferred-content-processing-info headers. Since Preferred-content-processing-type header is Byte-code, Proxy A converts a JAVASCRIPT code to Byte code. In addition, Proxy A converts a JAVASCRIPT code to Byte code by using Preferred-content-processing-info header so that it run on the client 2801, and then transmits it to the client 2801.

FIG. 29 is a diagram a case where the client 2901 wants to receive Native code converted from a JAVASCRIPT code, through WLAN. The client 2901 transmits an HTTP request message to Proxy A, indicated by reference number 2902, through a 3G mobile network (2911). Proxy A requests a JAVASCRIPT code in parallel mode (2913 and 2915) and receives the JAVASCRIPT code (2917 and 2919). Although the embodiment performs the request process in parallel mode, it should be understood that the present disclosure is not limited to the embodiment. It should be understood that an HTTP request is made in various modes. The Preferred-content-processing-link header of the HTTP request message transmitted from the client 2901 is WLAN-only; and the client 2901 is connected to Proxy A through a 3G mobile network. Therefore, Proxy A does not convert a JAVASCRIPT code to Byte code or Native code (2921). Proxy A transmits the JAVASCRIPT source code to the client 2901 (2923).

If the client 2901 uses not a 3G mobile network but WLAN, it operates as follows. The client 2901 requests JAVASCRIPT from Proxy A by using an HTTP request message. Proxy A performs request and reception of JAVASCRIPT. The Preferred-content-processing-link header of the HTTP request message transmitted from the client 2901 is WLAN-only; and the client uses WLAN. Therefore, Proxy A converts a JAVASCRIPT code to Native code specified in the Preferred-content-processing-type header and transmits it to the client. Proxy A converts the JAVASCRIPT code to Native code executable in the client, by using the Preferred-content-processing-info header.

Figure 30:
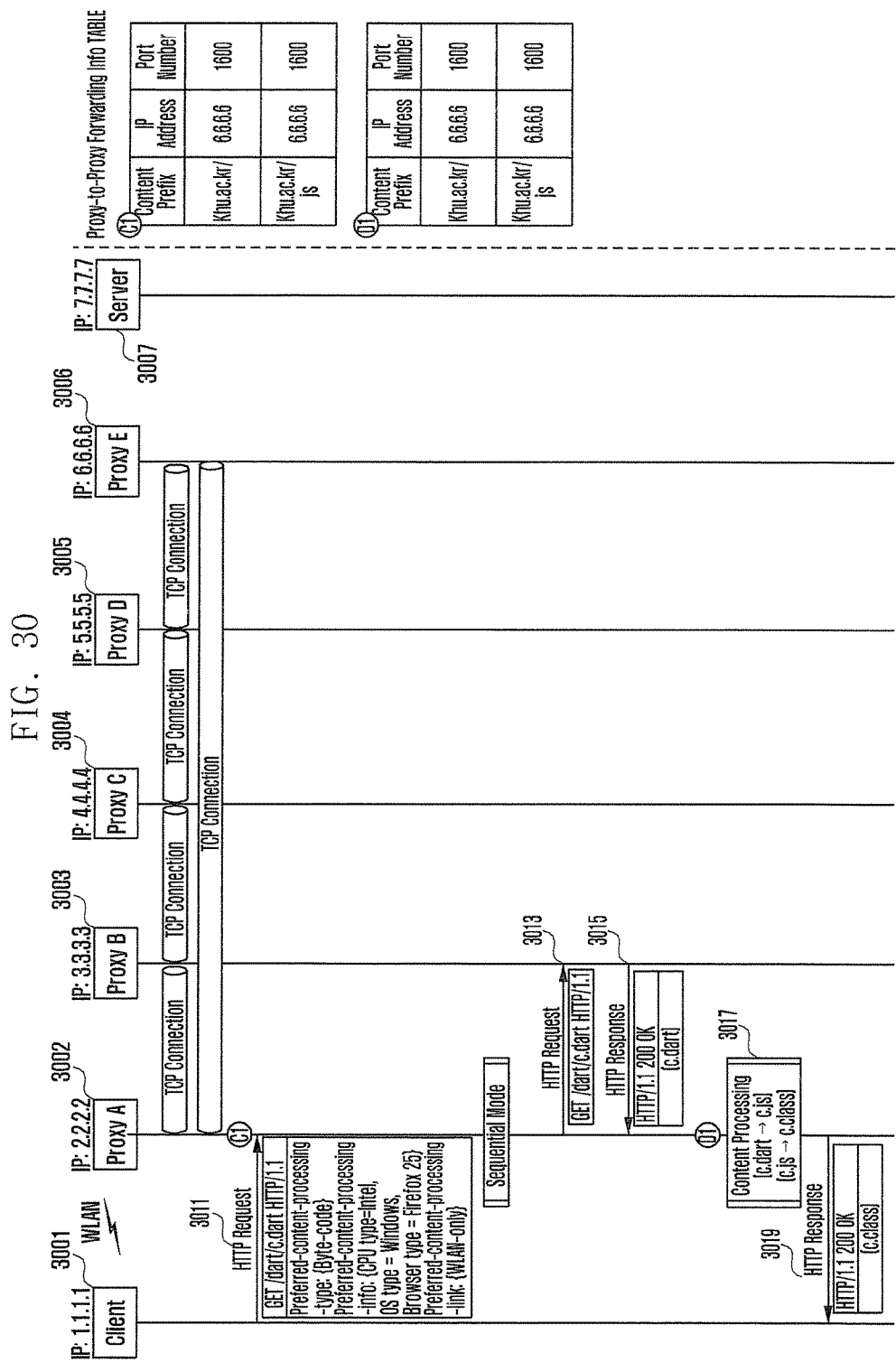
FIG. 30 illustrates a method of performing conversion and transmission of Script in a script language according to a third embodiment of the present disclosure.

FIG. 30 is a diagram that describes a method of performing conversion and transmission of Script in a script language according to a third embodiment of the present disclosure. Referring to FIG. 30, when the client requests a script code that is not supported by a web browser, the proxy server: requests and receives the script code requested by the client; converts the script code to another script code supported by the client; and transmits the converted script code to the client.

The client 3001 writes Preferred-content-processing-type, Preferred-content-processing-info, and Preferred-content-processing-link headers and requests a script code that is not supported by a web browser (3011). Proxy A, indicated by reference number 3002, requests the script code requested by the client (3013). Proxy A receives a script code corresponding to the script code request (3015).

Proxy A checks script codes supported by the client 3001, referring to Support Language Info TABLE shown in FIG. 15. The Support Language Info TABLE is a table storing information about script languages supported by browsers. Proxy A converts the script code to a script code supported by the client 3001 (3017). Proxy A compares a communication link used by the client 3001 with that written in the Preferred-content-processing-link header. Since the communication link of the client is WLAN and the communication link written in the Preferred-content-processing-link header is WLAN-only, Proxy A converts the converted script code to Byte code as a code type written in the Preferred-content-processing-type header, and transmits the Byte code to the client 3001 (3019).

In the embodiment of FIG. 30, when the client 3001 prefers Native code to any others, Proxy A may: convert a script code not supported by a web browser of the client 3001 to a script code supported by the web browser; convert the converted script code to Native code; and transmit the Native code to the client 3001.

Figure 31:
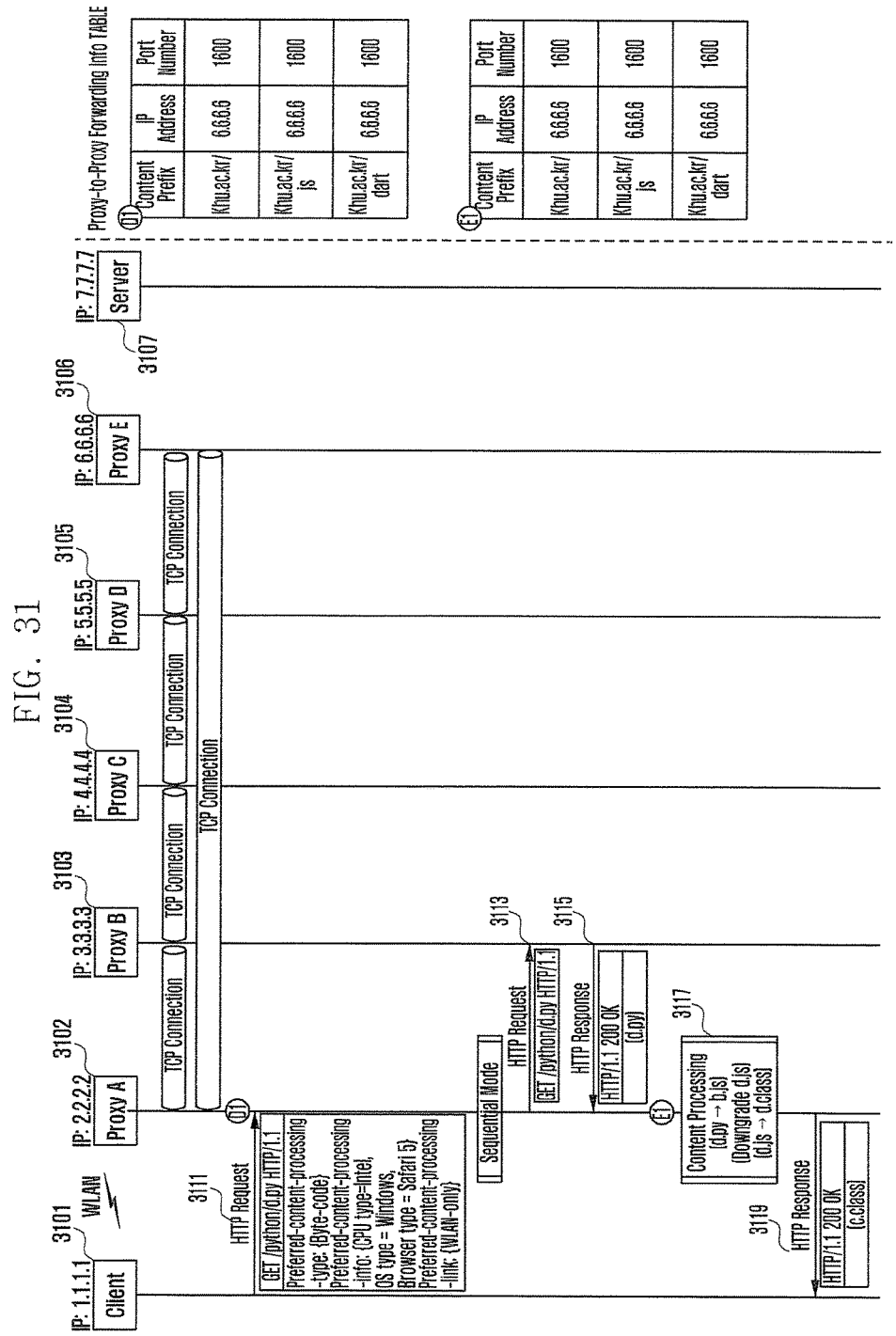
FIG. 31 illustrates a method of performing conversion and transmission of script code according to versions of a browser, according to a third embodiment of the present disclosure.

FIG. 31 is a diagram that describes a method of performing conversion and transmission of script code according to versions of a browser, according to a third embodiment of the present disclosure. Referring to FIG. 31, when the client using a version of web browser (low) requests a script code that can be executed only in another version of web browser (high) higher than the version (low), the proxy server converts the script code, executed only in a high version of web browser, to another script code that can be executed in a low version of web browser and transmits it to the client.

The client 3101 writes Preferred-content-processing-type, Preferred-content-processing-info, and Preferred-content-processing-link headers and requests a script code that cannot be executed in a low version of web browser from Proxy A indicated by reference number 3102, although it is written in a langue supported by web browsers (3111). Proxy A requests the script code from Proxy B indicated by reference number 3103 (3113). Proxy A receives the script code corresponding to the request from Proxy B (3115). Proxy A determines whether the script code is executable in the client 3101, based on information about Supported JAVASCRIPT Library Info TABLE shown in FIG. 16 and Preferred-content-processing-info.

When a script code is not executable in a web browser of the client 3101, Proxy A adds a framework or API that is not supported by a low version of web browser to the script code so that the script code can be executed in the low version of web browser (3117). Proxy A additionally compares a communication link of the client 3101 with the Preferred-content-processing-link header information, and determines whether to perform an additional conversion. Since the communication link of the client is WLAN and the communication link written in the Preferred-content-processing-link header is WLAN-only, Proxy A converts the converted script code to Byte code as a code type written in the Preferred-content-processing-type header and transmits it to the client (3119).

In the embodiment of FIG. 31, when the client 3101 prefers Native code to any others, Proxy A may: add a framework or API that is not supported by a low version of web browser to a script code that is not executable in a web browser of the client so that the script code can be executed in the low version of web browser; convert the script code to Native code; and transmit the Native code to the client 3101.

Figure 32:
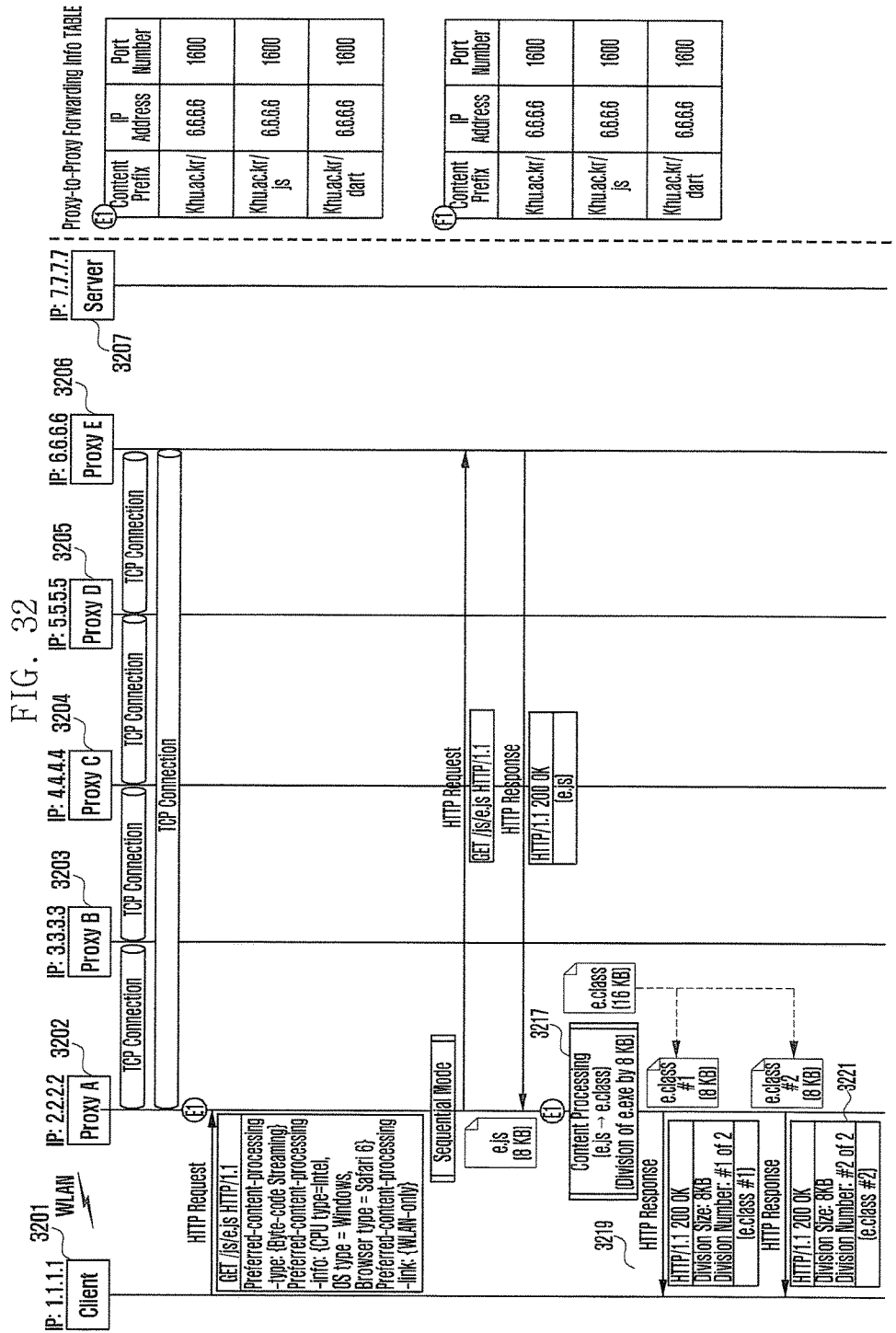
FIG. 32 illustrates a method of performing division and transmission of files according to communication links, according to a third embodiment of the present disclosure.

FIG. 32 is a diagram that describes a method of performing division and transmission of files according to communication links, according to a third embodiment of the present disclosure. The method is for a proxy server to convert a JAVASCRIPT code to Byte code or Native code according to communication links of a client and to transmit the converted code to the client, including division and transmission of the converted code. The difference between the embodiments shown in FIGS. 28 and 32 is that the Preferred-content-processing-type header is written with Byte-code streaming.

When the Preferred-content-processing-type header is written with Byte-code streaming, Proxy A indicated by reference number 3202 converts a JAVASCRIPT code to Byte code (3217). Proxy A divides the converted Byte code and transmits the divided codes to the client 3101 (3219 and 3221).

In the embodiment of FIG. 32, when the client 3201 prefers Native code to any others, since the Preferred-content-processing-type header is written with Native-code streaming, Proxy A converts the JAVASCRIPT source code to Native code; divides the converted Native code; and transmits the divided codes to the client.

A fourth embodiment according to the present disclosure is described. The fourth embodiment is to resolve a limitation in reducing the size of JAVASCRIPT code to be transmitted, by removing space characters and unnecessary codes. The fourth embodiment reduces the size of JAVASCRIPT code to be transmitted, by using the reusable JAVASCRIPT code.

The embodiment is designed in such a way as to: previously transmit a JAVASCRIPT code frequently used to a client; excludes the previously transmitted JAVASCRIPT code when the client requests a JAVASCRIPT code; and transmit the remaining part of the code and the index information about the excluded code, thereby reducing the size of JAVASCRIPT code to be transmitted.

In addition, when a JAVASCRIPT code is modified during the maintenance and update, a part of the current JAVASCRIPT code, modified and thus different from the previous JAVASCRIPT code, is transmitted, as a unit of function, to the client, thereby reducing the size of JAVASCRIPT code to be transmitted.

Figure 33:
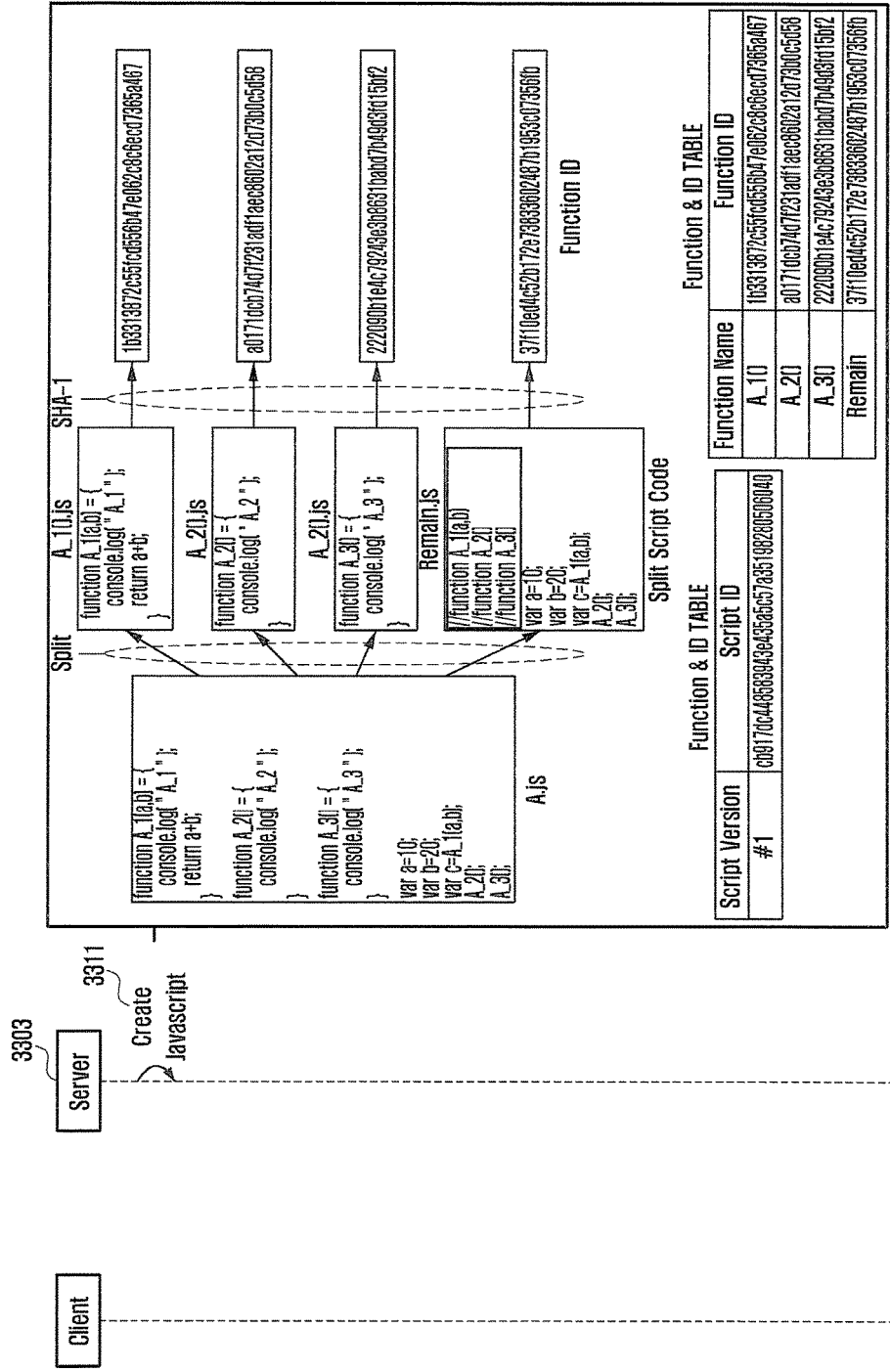
FIG. 33 illustrates a method for a server to perform processes to create JAVASCRIPT, according to a fourth embodiment of the present disclosure.

FIG. 33 is a diagram that describes a method for a server to perform processes to create JAVASCRIPT, according to a fourth embodiment of the present disclosure. When a JAVASCRIPT is created in a server, the JAVASCRIPT code is divided based on a unit of function. The server 3303 creates a Function ID of 20 bytes through SHA-1 algorithm that a divided function code as an input is entered into (3311). Function & ID TABLE is made as it is filled in with Function names and the Function IDs. Script IDs are created as Function IDs are entered into the SHA-1 algorithm. Script & ID TABLE is completed with Script Version and Script ID items.

Figure 34:
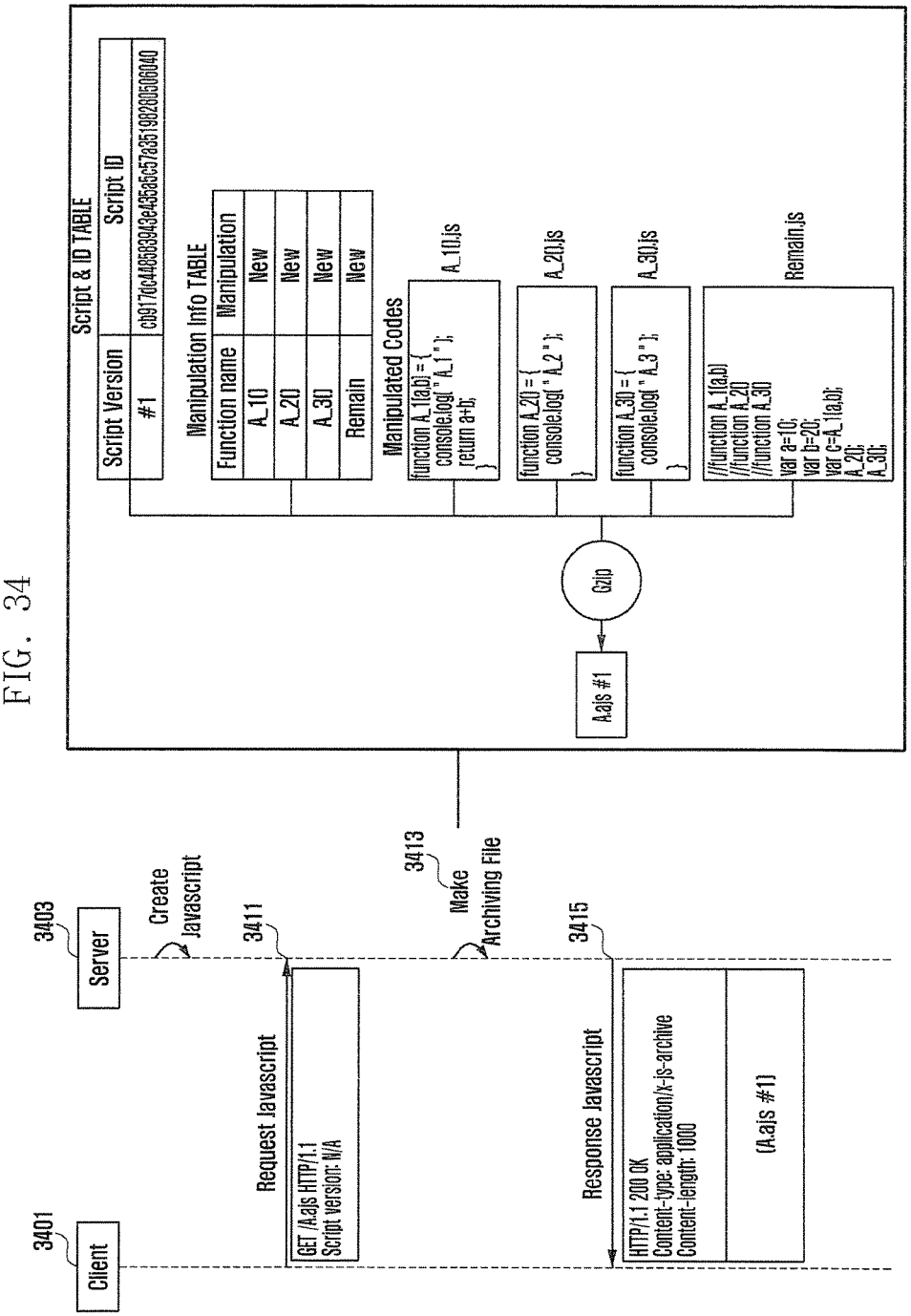
FIG. 34 illustrates a process of transmitting information about a change of JAVASCRIPT according to a fourth embodiment of the present disclosure.

FIG. 34 is a diagram that describes a method where, after Function & ID TABLE and Script & ID TABLE have been completed, a client requests a corresponding JAVASCRIPT from a server and the server transmits a code of a unit of function, information about a change of function, and version information to the client.

Referring to FIG. 34, the client 3401 requests not A.js file but A.ajs file from server 3403 (3411). The '.ajs' is an acronym of 'archive of JAVASCRIPT' which is a filename extension of a file and defined according to the present disclosure. The filename extension '.ajs' is a file format where a file is compressed by the Gzip, using a code of a unit of function, information about a change of function, and version information. According to the present disclosure, Script version as a header is defined in the HTTP request message. The 'Script version' header represents a version of JAVASCRIPT included in a client.

In the initial request, the Script version header is set to N/A. After receiving the initial request from the client, the server 3403 additionally creates Manipulation Info TABLE (3413). The table stores information about a change of function by comparing JAVASCRIPT of the client 3401 with JAVASCRIPT of the server 3403, and includes Function name and Manipulation attribute. The Function name attribute represents a function name existing in the JAVASCRIPT code.

The Manipulation attribute represents information about a change of function. 'New,' 'Modified,' and 'Removed' are used as Manipulation attribute values in the embodiment. As JAVASCRIPT code is modified, 'New' is used for a new function; 'Modified' is used when content of a function is modified; and, 'Removed' is used when a function is removed, compared with the previous Script. When a request is first made, which is called the initial request, the Manipulation attribute values are set to New for all the functions in Manipulation Info TABLE. When the Manipulation Info TABLE has been created, Manipulation attributes of Script & ID TABLE, Manipulation Info TABLE, and Manipulation Info TABLE are compressed as a function code 'Modified' or 'New' by using Gzip. Since all the functions have an attribute value 'New,' all the unit codes in the functions is compressed by Gzip. When completing the procedure, the server 3403 includes the A.ajs file in the HTTP response message and transmits it to the client 3401 (3415).

Figure 35:
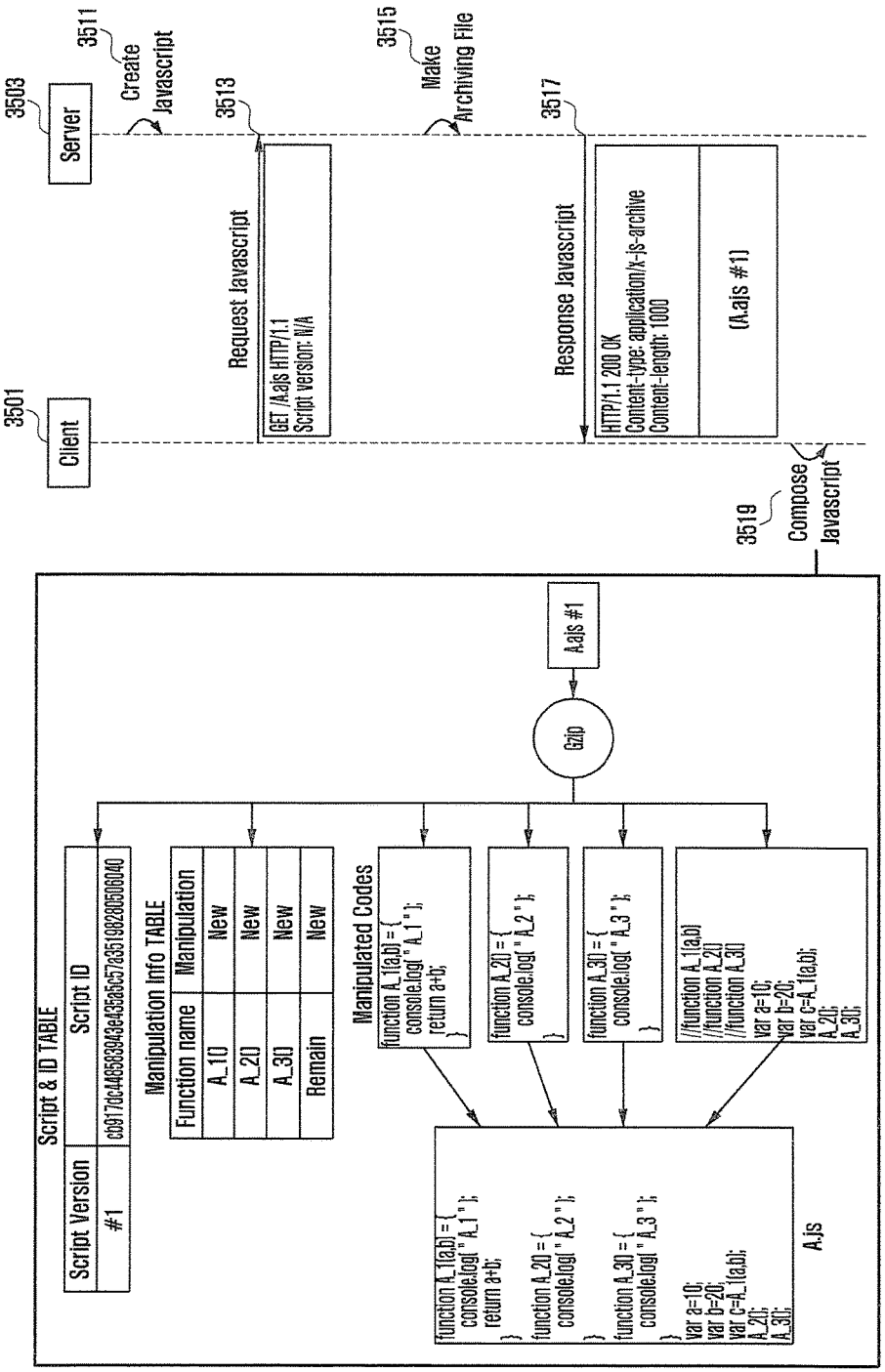
FIG. 35 illustrates restoration of JAVASCRIPT code of a client, according to a fourth embodiment of the present disclosure.

FIG. 35 is a diagram that describes a method for a client to receive an A.ajs file from a server and to restore a JAVASCRIPT code. Operations 3511 to 3517 correspond to operations 3311 to 3317 and 3411 to 3417 shown in FIGS. 33 and 34 respectively. The client 3401 de-compresses the received A.ajs file by using Gzip (3519).

The client 3501 combines the codes, received by a unit of function, by using the Manipulation Info TABLE, to form one JAVASCRIPT file, thereby receiving JAVASCRIPT files. In addition, the client create Function IDs for the divided function codes by using an SHA-1 algorithm, create Script ID by using Function IDs created according to functions, and determine whether the created Script ID is consistent with Script ID of the Script & ID TABLE, thereby checking the integrity of code.

Figure 36:
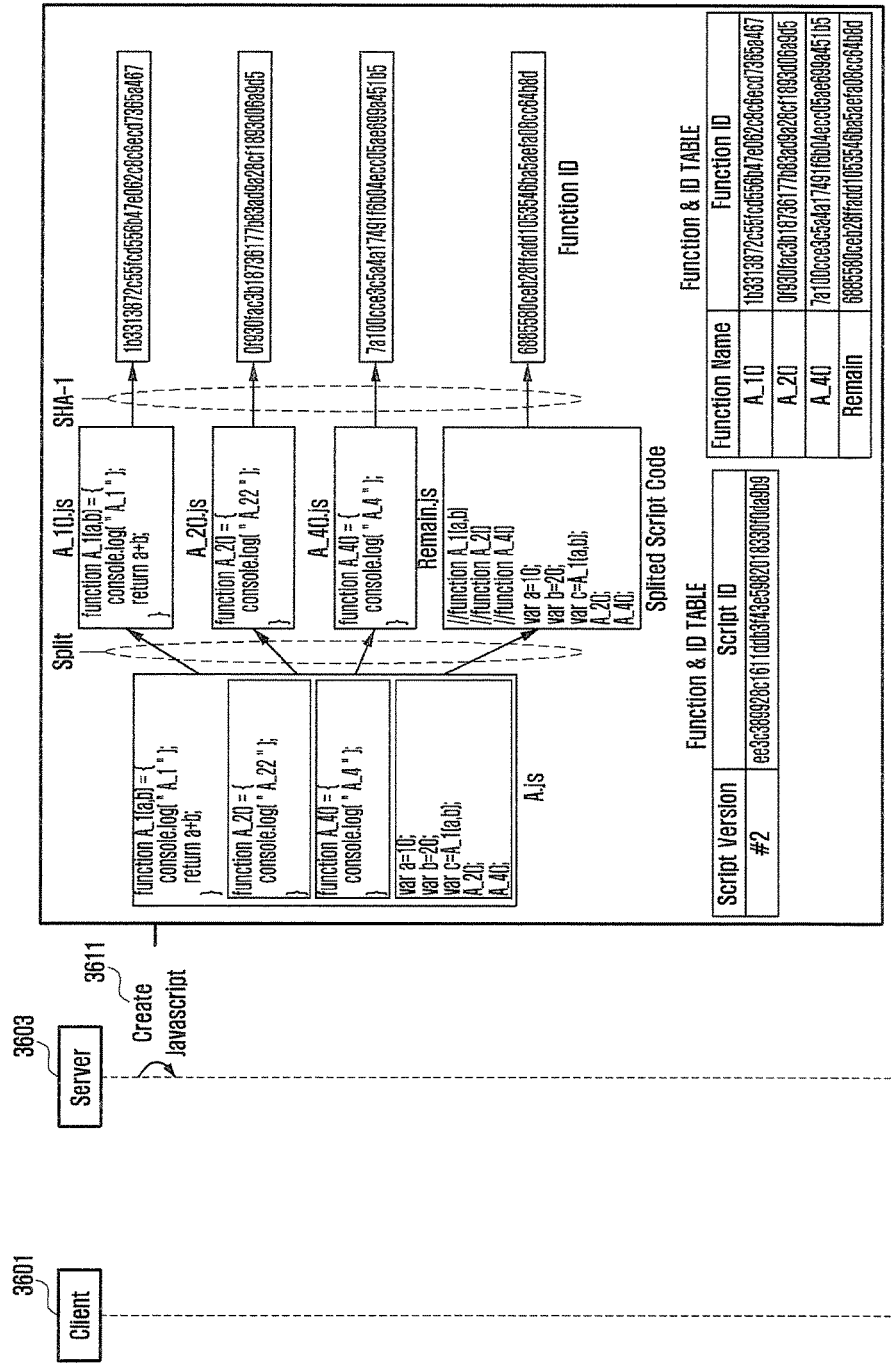
FIG. 36 illustrates a process when JAVASCRIPT code is changed, according to a fourth embodiment of the present disclosure.

FIG. 36 is a diagram that describes a process when a JAVASCRIPT code is changed, according to a fourth embodiment of the present disclosure. When a JAVASCRIPT code is changed, the server 3603 divides it based on a unit of function as descried above referring to FIG. 33. The server creates Function ID as the divided functions are processed, based on codes, by an SHA-1 algorithm. The server inserts Function names and Function IDs into Function & ID TABLE, thereby completing the table. After that, Function IDs are entered into the SHA-1 algorithm to create Script IDs. The Script IDs are inserted into Script & ID TABLE, thereby completing the table. In the embodiment of FIG. 36, Script Version is #2 (3611), compared with the embodiment of FIG. 33 where Script Version is #1.

Figure 37:
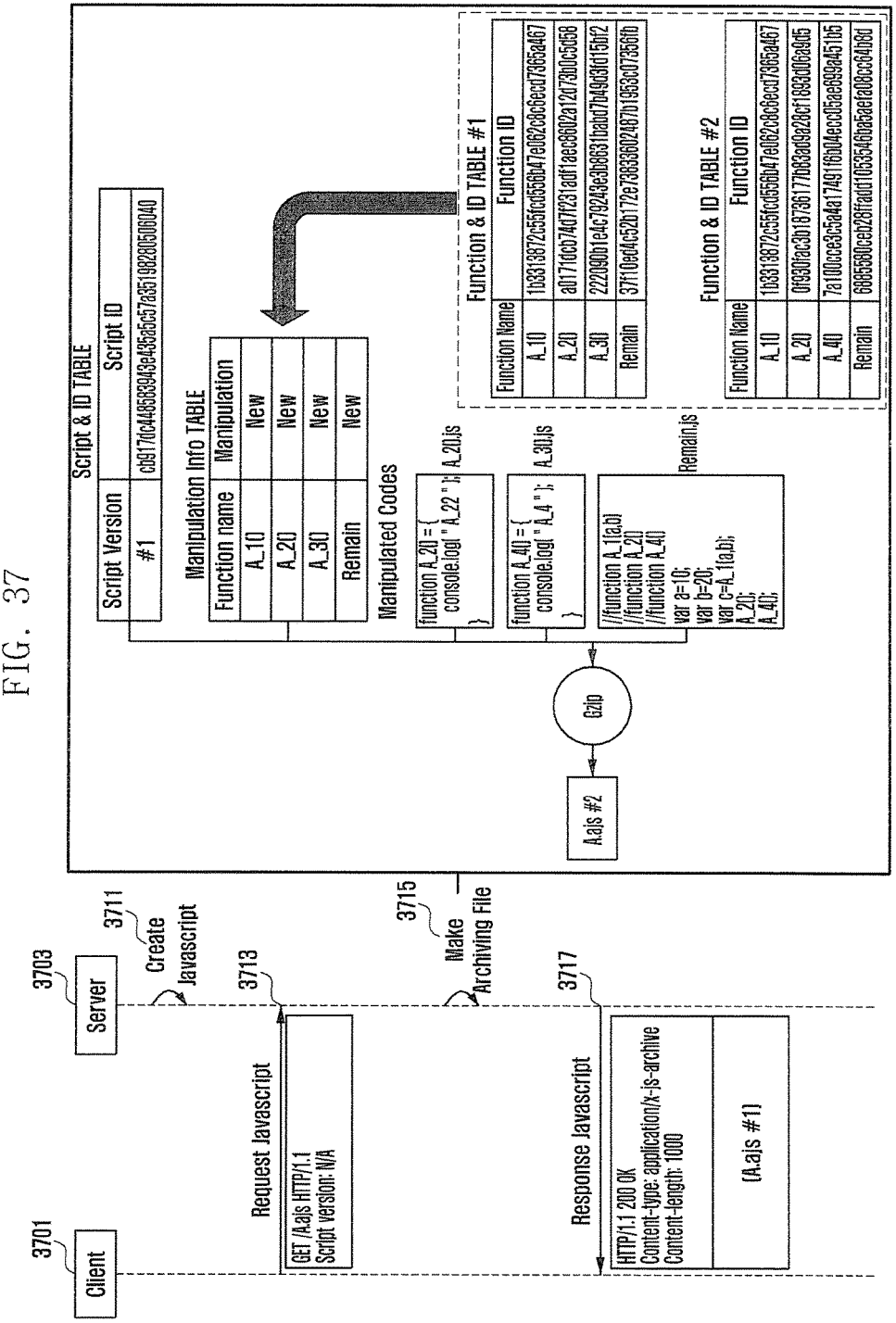
FIG. 37 illustrates transmission of information about a change of JAVASCRIPT according to a fourth embodiment of the present disclosure.

FIG. 37 is a diagram that describes transmission of information about a change of JAVASCRIPT according to a fourth embodiment of the present disclosure. In a state where a JAVASCRIPT code is divided and Function & ID TABLE and Script & ID TABLE have been created (3711), the client requests the same JAVASCRIPT code by using an HTTP request message (3713). The server 3703 compares the previous JAVASCRIPT code with the current JAVASCRIPT code based on a unit of function and seeks a new function, a modified function and a removed function (3715). After that, the server creates Manipulation Info TABLE based on the sought functions. Since A_2( ) function and Remain code representing the rest codes excluding functions have been changed, the Manipulation attribute is set to 'Modified.' Since A_3( ) function is removed with the change of JAVASCRIPT code, the Manipulation attribute is set to 'Removed.' Since A_4( ) function has not been in the previous JAVASCRIPT, the Manipulation attribute is set to 'New.' After completing the Manipulation TABLE, the server creates A.ajs file, by using Gzip, from function codes of which Manipulation attributes of Script & ID TABLE, Manipulation Info TABLE, and Manipulation Info TABLE are set to 'Modified' or 'New.' Since A_2( ), A_4( ) and Remain representing codes excluding functions have an attribute value, 'Modified' of 'New,' these three codes is compressed by Gzip.

The server 3703 transmits the A.ajs file to the client 3701 by using the HTTP response message (3717).

Figure 38:
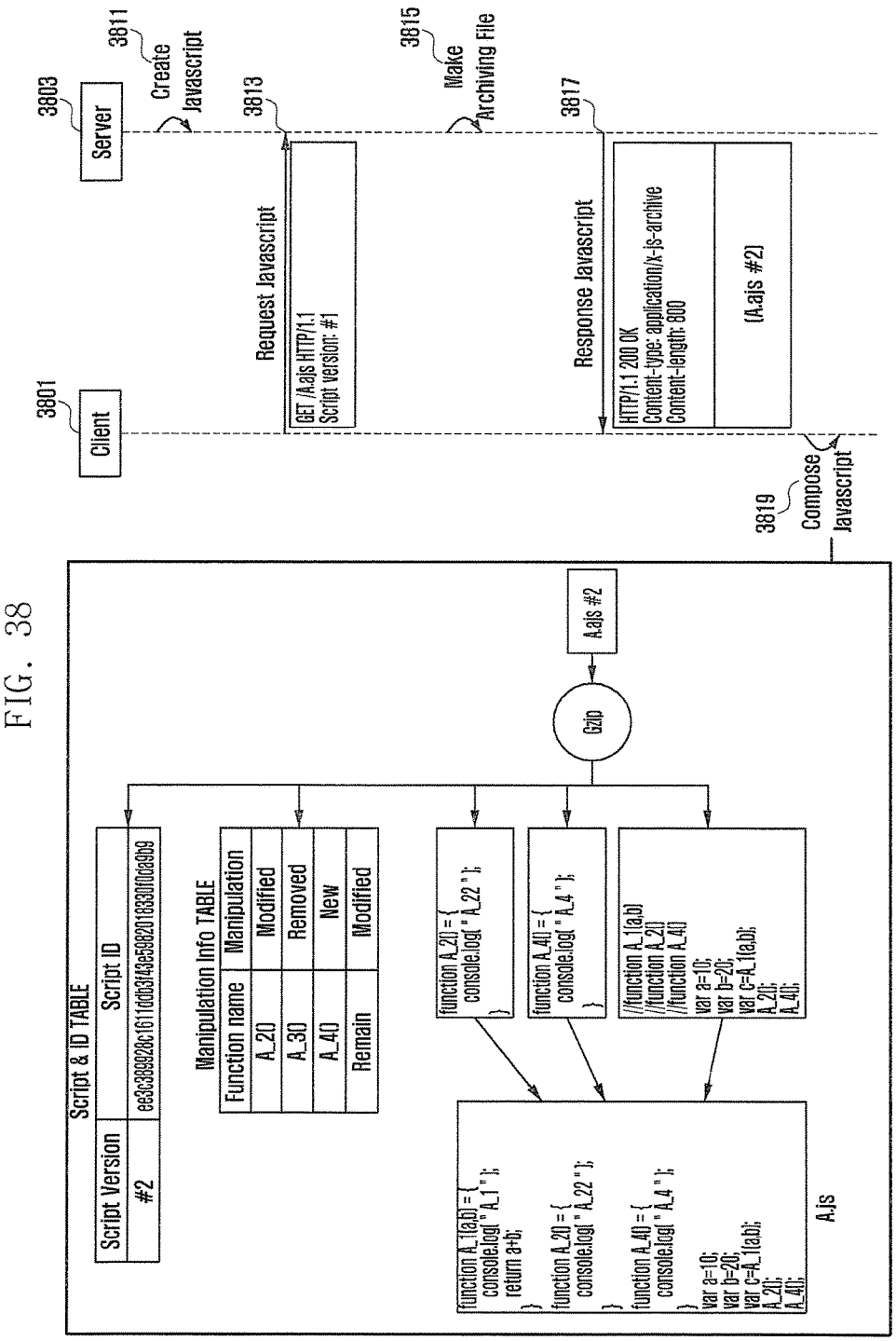
FIG. 38 illustrates restoration of JAVASCRIPT code of a client, according to a fourth embodiment of the present disclosure.

FIG. 38 is a diagram that describes restoration of JAVASCRIPT code of a client, according to a fourth embodiment of the present disclosure. When the client receives an A.ajs file as the procedure shown in FIG. 37, it converts the file to a JAVASCRIPT code as follows.

The client 3801 decompresses the received A.ajs file by using Gzip (3819). The client 3801 creates JAVASCRIPT #2 by using Manipulation Info TABLE, a changed function code, and JAVASCRIPT #1, previously received. In Manipulation Info TABLE, a function of which the Manipulation attribute value is 'New' is added to JAVASCRIPT #1; a function of which the Manipulation attribute value is 'Removed' is removed from JAVASCRIPT #1; and a function of which the Manipulation attribute value is 'Modified' is replaced with a newly received function code in JAVASCRIPT #1. Therefore, A_2( ) and Remain code excluding functions are removed from the JAVASCRIPT #1, and A_2( ) function and Remain code excluding functions, newly received, are inserted to the JAVASCRIPT #1.

A_3( ) is removed from JAVASCRIPT #1, and A_4( ) is newly added thereto. During this process, JAVASCRIPT #2 is created. In addition, the client create Function IDs for the divided function codes by using an SHA-1 algorithm, create Script ID by using Function IDs created according to functions, and determine whether the created Script ID is consistent with Script ID of the Script & ID TABLE, thereby checking the integrity of code.

In the fourth embodiment, the operation when a JAVASCRIPT code has not changed is similar to a case where a web cache is created. For example, as shown in FIG. 38, since the client has JAVASCRIPT #2, it sets the Script version header of the HTTP request message to #2 and transmits the message for requesting JAVASCRIPT to the server.

After receiving the HTTP request message from the client, the server ascertains that corresponding JAVASCRIPT code has not been changed through the Script version header of the received HTTP request message and that its JAVASCRIPT version is the same as the client's JAVASCRIPT version. Therefore, the server transmits the HTTP response message Not Modified' to the client. The client uses the stored JAVASCRIPT.

In the following description, as another embodiment, a method is provided where: a JAVASCRIPT code that is expected to be frequently used or that is frequently used has been selected as a Core JAVASCRIPT and then transmitted to a mobile device; when the mobile device requests the JAVASCRIPT code, the proxy server or web server transmits the JAVASCRIPT code excluding the Core JAVASCRIPT and the index information about the excluded code to the client (mobile device).

The transmission of a Core JAVASCRIPT is performed as follows: a JAVASCRIPT code that is expected to be frequently used is selected as a Core JAVASCRIPT; and the server has transmitted the Core JAVASCRIPT to the client before the client requests the JAVASCRIPT.

Figure 39:
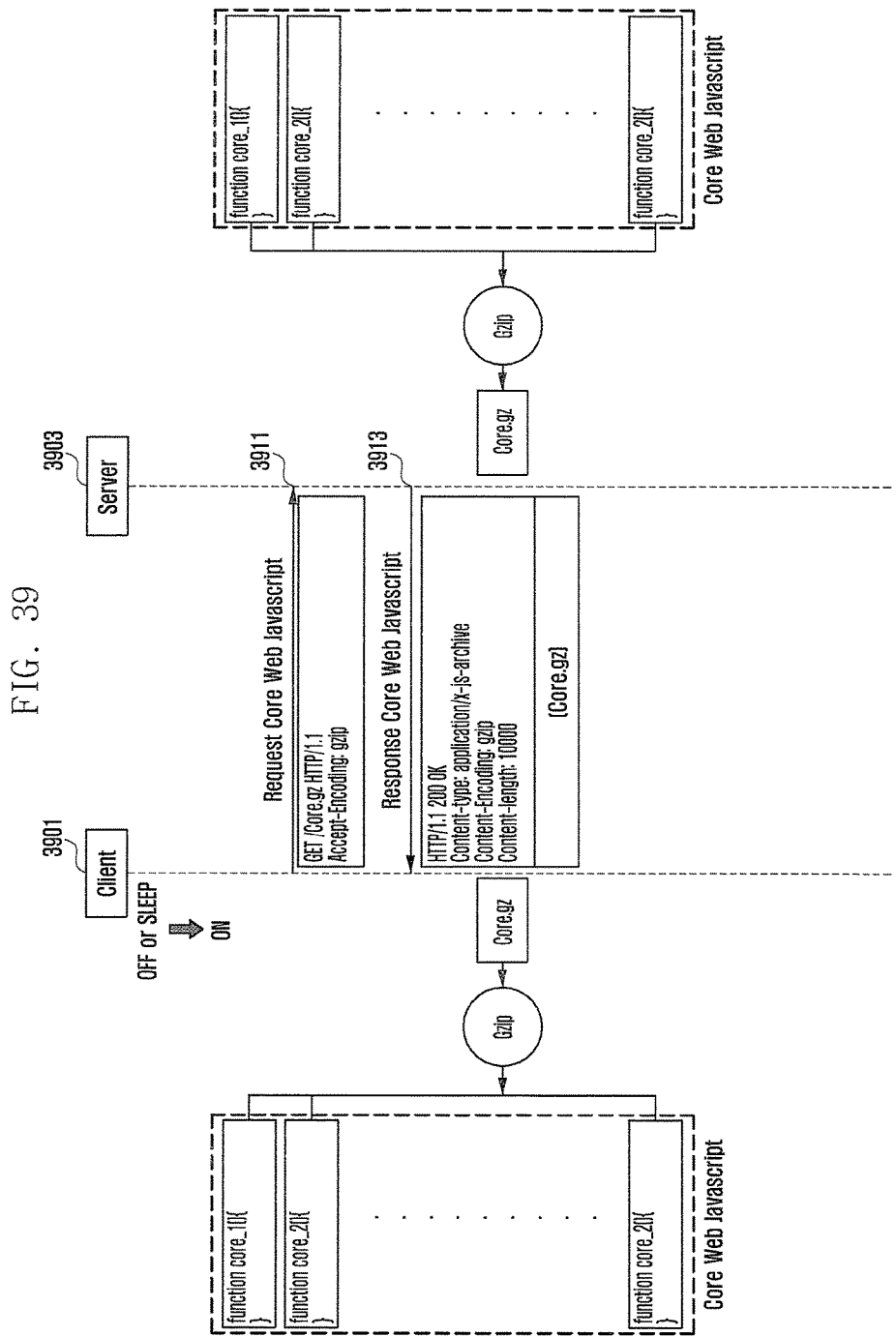
FIG. 39 illustrates a method of transmitting Core JAVASCRIPT in advance, according to various embodiments of the present disclosure.

FIG. 39 is a diagram that describes a method of transmitting a Core JAVASCRIPT in advance, according to another embodiment of the present disclosure. Referring to FIG. 39, the server 3903 has selected a JAVASCRIPT function that is expected to be frequently used before a client's request. For example, the server 3903 has selected 100 functions as Core JAVASCRIPT and compressed them to a Core.gz file by Gzip before a client's request.

Assuming that the client 3901 is a mobile device, when the client 3901 is turned on from a turned-off or sleep state, it requests the Core.gz file compressed from Core JAVASCRIPT from the server 3903 (3911). After receiving the request from the client, the server 3903 transmits the Core.gz file to the client 3901 (3913). After that, the client 3901 decompresses the compressed file to create Core JAVASCRIPT by Gzip.

Figure 40:
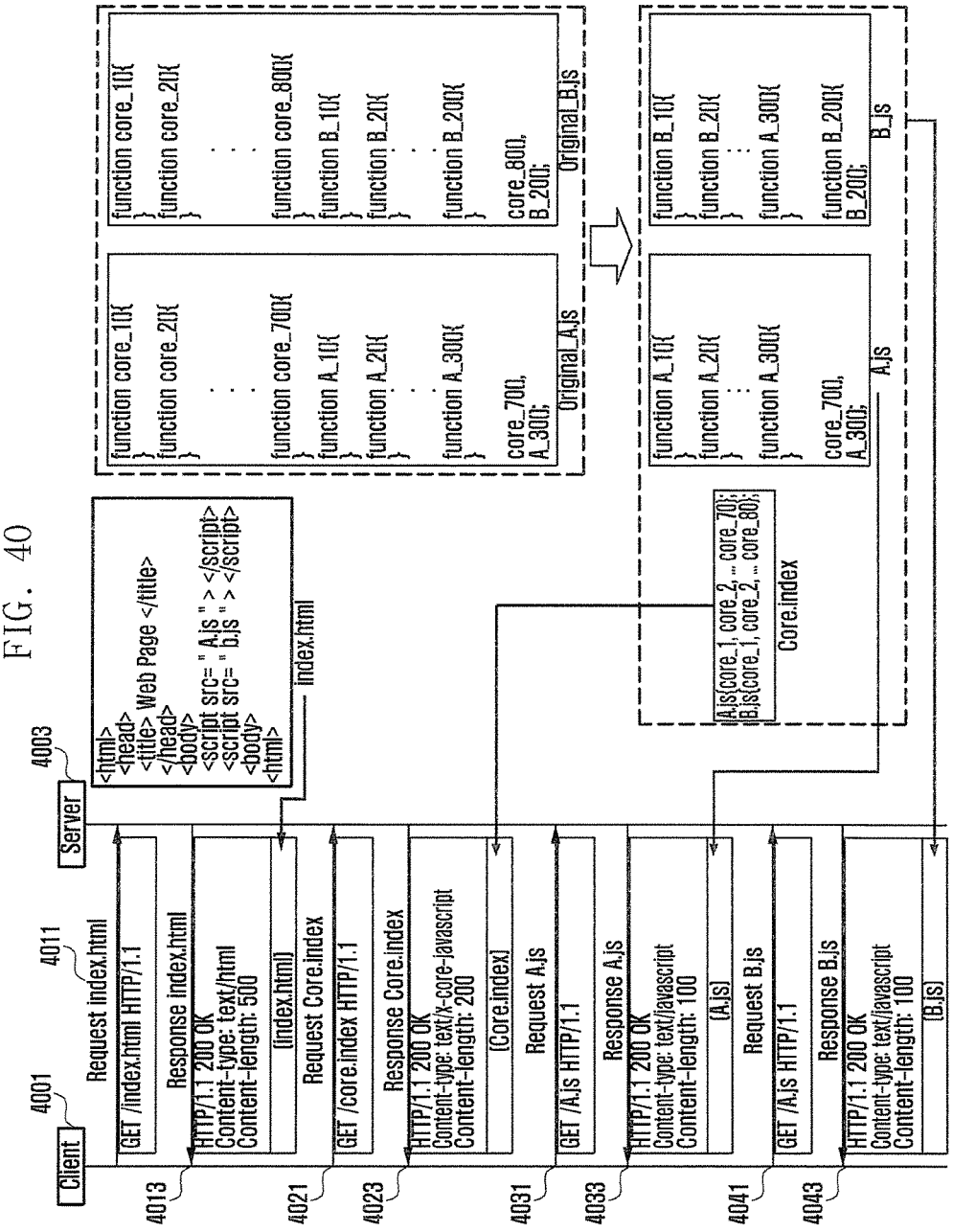
FIG. 40 illustrates transmission of an index file and a JAVASCRIPT code excluding Core JAVASCRIPT, according to various embodiments of the present disclosure.

FIG. 40 is a diagram that describes transmission of an index file and a JAVASCRIPT code excluding Core JAVASCRIPT, according to another embodiment of the present disclosure. When the provision for transmission of Core JAVASCRIPT before a request has been completed as described above referring to FIG. 39, the client 4001 efficiently receives JAVASCRIPT code from the server 4003 by using the Core JAVASCRIPT transmission method.

The embodiment of FIG. 40 is described based on a method of requesting a web page containing two JAVASCRIPT resources. The web page is index.html. The JAVASCRIPT resources forming the page are Original_A.js and Original_B.js.

When the web page and the resources for the web page are created, the server 4003 creates a JAVASCRIPT code forming the web page, excluding Core JAVASCRIPT, and an index file indicating which Core JAVASCRIPT has been used. During this process, JAVASCRIPT codes without Core JAVASCRIPT, A.js and B.js, are created and the index file, Core.index, is also crated.

The client 4001 requests a web page from the server 4003 (4011). The client 4001 receives the web page from the server 4003 (4013). After receiving the web page, the client 4001 requests the index file, Core.index, from the server 4003 before it requests resources forming the web page, JAVASCRIPT (4021). The client 4001 receives Core.index from the server 4003 (4023). After requesting Core.index, the client 4001 requests A.js and B.js from the server 4003 (4031 and 4041). When the client 4001 has received Core.index, A.js, and B.js, it restores the JAVASCRIPT code by using index information about the index file.

Since the Core.index file includes the index information where the A.js file has used core_1( ) to core_70( ) of the Core JAVASCRIPT, the client 4001 restores the Original_A.js by inserting core_1( ) to core_70( ) into the A.js. Similarly, the client 4001 detects the index information of the Core.index, included in the B.js and restores the Original_B.js by inserting core_1( ) to core_80( ) into the B.js file.

As described above, according to embodiments of the present disclosure, the method and apparatus can improve Hyper Text Transfer Protocol (HTTP) performance on communication networks.

According to embodiments of the present disclosure, since the number of transmission messages for detecting whether resources forming a web page have been changed is reduced, a page loading time can be reduced. According to embodiment of the present disclosure, since request and reception of content between entities is performed by bypassing Proxy Chain, an HTTP message processing time required each time it is forwarded through a proxy server is not needed, thereby reducing the transmission time for HTTP messages.

According to embodiments of the present disclosure, the proxy server converts JAVASCRIPT code to be transmitted into Byte code or Native code, considering a communication link of a mobile device, and transmits the converted code to the mobile device, thereby reducing a web page loading time on the mobile device. When a mobile device requests a script code that is not supported by the web browser, the proxy server converts the script code into another script code in a script language executable on the mobile device and transmits it to the mobile device, thereby enhancing the compatibility of web services.

According to embodiments of the present disclosure, when a mobile device requests a script code that is not executable in a low version of web browser, the proxy server adds a framework or API to the script code requested by the mobile device so that the script code be executed in the low version of web browser, and transmits the script cod to the mobile device, thereby enhancing the compatibility of web services.

According to embodiments of the present disclosure, the proxy server convert a JAVASCRIPT code to be transmitted to a mobile device into Byte code or Native code, considering a communication link of the mobile device, divide the converted code, and transmit the divided codes. When a file size is relatively large or network delay occurs, the proxy server transmits the files divided by the server to the mobile device, thereby quickly providing web services.

According to embodiments of the present disclosure, JAVASCRIPT codes continue to be corrected and maintained, considering the reusability. The function code changed considering the reusability of JAVASCRIPT code and information about a change of function are transmitted, the size of JAVASCRIPT code to be transmitted be reduced, thereby reducing a period of time for transmission of JAVASCRIPT code and a period of time for blocking JAVASCRIPT.

According to embodiments of the present disclosure, a JAVASCRIPT code that is expected to be frequently used or that is frequently used is selected as Core JAVASCRIPT and transmitted to a mobile device before a request for JAVASCRIPT code is made. When the mobile device requests the JAVASCRIPT code, the JAVASCRIPT code excluding the Core JAVASCRIPT and the index information about the excluded code are transmitted to the mobile device, thereby reducing the size of JAVASCRIPT code to be transmitted, a period of time for transmission of JAVASCRIPT code and a period of time for blocking JAVASCRIPT.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a first server in a communication system, the method comprising:
   receiving a request for content from a client device, the client device comprising a processor and network interface;
   transmitting, to a second server, a first message including the request for the content;
   receiving, from a third server, a second message for establishing a bypass connection to directly receive the content;
   updating a forwarding information table based on the second message;
   setting a period of time for maintaining the bypass connection;
   directly receiving the content from the third server by using the bypass connection without passing through the second server;
   transmitting the content to the client device;
   receiving a request for a new content from the client device;
   transmitting a third message for the new content to one of the second server or the third server based on the forwarding information table if a sequential mode is configured; and
   transmitting the third message for the new content to both the second server and the third server if a parallel mode is configured,
   wherein the bypass connection between the first and third servers is maintained for the set period of time.

2. The method of claim 1, further comprising:
   establishing a bypass Transmission Control Protocol (TCP) connection between the first server and the third server based on the second message.

3. The method of claim 1, further comprising:
   creating bypass connection parameters between proxies, wherein the bypass connection parameters correspond to at least one of TCP port numbers and an IP address of the first server;
   transmitting the created bypass connection parameters to the third server through the second server; and
   establishing the bypass connection based on a bypass TCP connection request of the third server.

4. The method of claim 1, wherein the first server, the second server and the third server are proxy servers.

5. The method of claim 1, further comprising:
   updating inter-proxy information containing TCP port numbers and an IP address of the third server and a content prefix received through the bypass connection; and
   determining whether to use the established bypass connection according to a content request transmitted from the client device, based on the inter-proxy information.

6. The method of claim 1, further comprising:
   performing an authentication to receive the content from the third server, wherein the authentication comprises:
      receiving an authentication request message from the third server;
      transmitting an authorization message for authorizing authentication to the third server; and
      receiving an access authorization message from the third server.

7. The method of claim 1, further comprising:
   establishing a push for the content with the third server; and receiving, when the push for the content is established and the content of the third server is changed, the changed content by using the bypass connection.

8. A first server in a communication system, the first server comprising:
a communication unit configured to transmit and receive a signal; and
a controller configured to control the communication unit to:
receive a request for content from a client device, the client device comprising a processor and a network interface,
transmit a first message including the request for the content to a second server,
receive, from a third server, a second message for establishing a bypass connection to directly receive the content,
set a period of time for maintaining the bypass connection,
update a forwarding information table based on the second message,
directly receive the content from the third server by using the bypass connection without passing through the second server,
transmit the content to the client device,
receive a request for a new content from the client device,
transmit a third message for the new content to one of the second server or the third server based on the forwarding information table if a sequential mode is configured, and
transmit the third message for the new content to both the second server and the third server if a parallel mode is configured,
wherein the bypass connection between the first and third servers is maintained for the set period of time.

9. The first server of claim 8, wherein the controller is further configured to:
establish a bypass Transmission Control Protocol (TCP) connection between the first server and the third server.

10. The first server of claim 8, wherein the controller is further configured to:
create bypass connection parameters between proxies, wherein the bypass connection parameters correspond to at least one of TCP port numbers and an IP address of the first server,
transmit the created bypass connection parameters to the third server through the second server, and
establish the bypass connection based on a bypass TCP connection request of the third server.

11. The first server of claim 8, wherein the first server, the second server and the third server are proxy servers.

12. The first server of claim 8, wherein the controller is further configured to:
update inter-proxy information containing TCP port numbers and an IP address of the third server and a content prefix received through the bypass connection, and
determine whether to use the established bypass connection according to a content request transmitted from the client device, based on the inter-proxy information.

13. The first server of claim 8, wherein the controller is further configured to:
control the communication unit to receive an authentication request message from the third server,
control the communication unit to transmit an authorization message for authorizing authentication to the third server,
control the communication unit to receive an access authorization message from the third server, and
perform an authentication to receive the content from the third server.

14. The first server of claim 8, wherein the controller is further configured to:
establish a push for content with the third server, and
receive, when the push for the content is established and content of the third server is changed, the changed content by using the bypass connection.

* * * * *